(12) United States Patent
Xu et al.

(10) Patent No.: US 12,530,018 B2
(45) Date of Patent: Jan. 20, 2026

(54) MODEL PREDICTIVE CONTROL SYSTEMS FOR PROCESS AUTOMATION PLANTS

(71) Applicant: Fisher-Rosemount Systems, Inc., Round Rock, TX (US)

(72) Inventors: Shu Xu, San Diego, CA (US); Mark Nixon, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 428 days.

(21) Appl. No.: 18/115,317

(22) Filed: Feb. 28, 2023

(65) Prior Publication Data

US 2024/0288849 A1  Aug. 29, 2024

(51) Int. Cl.
  *G05B 19/4155* (2006.01)
(52) U.S. Cl.
  CPC ............ *G05B 19/4155* (2013.01); *G05B 2219/42058* (2013.01)
(58) Field of Classification Search
  None
  See application file for complete search history.

(56) References Cited

U.S. PATENT DOCUMENTS

| 6,721,609 | B1  | 4/2004  | Wojsznis et al. |
| 7,050,863 | B2  | 5/2006  | Mehta et al. |
| 7,330,767 | B2  | 2/2008  | Thiele et al. |
| 7,856,281 | B2  | 12/2010 | Thiele et al. |
| 8,185,217 | B2  | 5/2012  | Thiele |
| 8,200,346 | B2  | 6/2012  | Thiele |
| 10,061,286 | B2 | 8/2018  | Wojsznis et al. |
| 2007/0078530 | A1* | 4/2007 | Blevins ............... G05B 13/041 700/29 |
| 2007/0168057 | A1* | 7/2007 | Blevins ............... G05B 13/048 700/53 |
| 2009/0143872 | A1* | 6/2009 | Thiele ................. G05B 13/048 700/30 |

(Continued)

OTHER PUBLICATIONS

International Search Report from corresponding PCT Application No. PCT/US2024/016510, dated Aug. 5, 2024.

(Continued)

*Primary Examiner* — David Earl Ogg
(74) *Attorney, Agent, or Firm* — Harness, Dickey & Pierce, P.L.C.

(57) ABSTRACT

A model predictive control (MPC) device includes an input interface configured to receive an industrial process input associated with at least one component of a process automation plant, an output interface configured to transmit a control instruction to control the component, memory configured to store first and second MPC process models corresponding to different states, and a processor configured to identify a current state parameter of an industrial process, and predict a future industrial process output using the first or second MPC process model, based on the current state parameter being associated with the first or second MPC process model. The processor is configured to calculate a target operating point according to the predicted future industrial process output, determine a control signal to drive the industrial process to the calculated target operating point, and output the determined control signal to control operation of the component of the industrial process plant.

20 Claims, 17 Drawing Sheets

(56) References Cited

U.S. PATENT DOCUMENTS

| | | | | |
|---|---|---|---|---|
| 2010/0087933 A1* | 4/2010 | Cheng | ............... | G05B 19/0423 |
| | | | | 700/30 |
| 2014/0358254 A1 | 12/2014 | Chu et al. | | |
| 2018/0341252 A1* | 11/2018 | Lu | ....................... | G05B 13/048 |
| 2021/0116891 A1* | 4/2021 | Zhao | .................... | G05B 13/048 |
| 2022/0292370 A1* | 9/2022 | Ishii | .................... | G06F 16/906 |

OTHER PUBLICATIONS

Kuure-Kinsey M. et al: "Multiple Model Predictive Control: A State Estimation based Approach", American Control Conference, 2007. ACC '07, IEEE, Piscataway, NJ, USA, Jul. 9, 2007, p. 3739-3744, XP031215556, ISBN:978-1-4244-0988-4.
Gain-Scheduled MPC Control of Nonlinear Chemical Reactor, https://web.archive.org/web/20220518025801/https://www.mathworks.com/help/mpc/ug/gain-scheduling-mpc-control-of-nonlinear-chemical-reactor.html.
Adaptive MPC Control of Nonlinear Chemical Reactor Using Linear Parameter-Varying System; https://web.archive.org/web/20220528150931/https://www.mathworks.com/help/mpc/ug/adaptive-mpc-control-of-nonlinear-chemical-reactor-using-linear-parameter-varying-syste.
Adaptive MPC Control of Nonlinear Chemical Reactor Using Online ModelEstimation, https://web.archive.org/web/20220526083307/https://www.mathworks.com/help/mpc/ug/adaptive-mpc-control-of-nonlinear-che.

\* cited by examiner

MODEL PREDICTIVE CONTROL SYSTEMS FOR PROCESS AUTOMATION PLANTS

FIELD

This application relates to model predictive control (MPC) systems for process automation plants.

BACKGROUND

This section provides background information related to the present disclosure which is not necessarily prior art.

Model predictive control (MPC) is an advanced method of process control for controlling a process while satisfying a set of constraints. MPC is often used in industrial process plants, such as chemical plants, oil refineries, electric power systems, etc. MPC devices may allow a current timeslot to be optimized, and have the ability to anticipate future events and take control actions accordingly.

SUMMARY

This section provides a general summary of the disclosure, and is not a comprehensive disclosure of its full scope or all of its features.

According to one aspect of the present disclosure, a model predictive control (MPC) device includes an input interface configured to receive an industrial process input associated with at least one component of a process automation plant, an output interface configured to transmit a control instruction to control operation of the at least one component of the process automation plant, memory configured to store a first MPC process model, a second MPC process model, and computer-executable instructions, the first MPC process model including at least one control parameter different than a control parameter of the second MPC process model, the at least one control parameter including one or more of a gain value, a time constant value, and a dead time value. The device includes at least one processor configured to execute the computer-executable instructions to receive an industrial process input via the input interface, identify a current state parameter of an industrial process of the process automation plant, predict, using the first MPC process model, a future industrial process output according to the received industrial process input, in response to the current state parameter having a first state value associated with the first MPC process model, predict, using the second MPC process model, the future industrial process output according to the received industrial process input, in response to the current state parameter having a second state value associated with the second MPC process model, the first state value different than the second state value, calculate a target operating point according to the predicted future industrial process output, determine a control signal to drive the industrial process to the calculated target operating point, and output the determined control signal via the output interface to control operation of the at least one component of the process automation plant.

According to another aspect of the present disclosure, a method of determining state parameter clusters for an MPC device of a process automation plant includes receiving a specified number of operating point clusters, obtaining, via an input interface, at least one operating state parameter associated with at least one component of the process automation plant, the at least one operating state parameter obtained at multiple time points during operation of the process automation plant to define multiple historical operating state parameter values, and applying a clustering algorithm to the multiple historical operating state parameter values to define a specified number of operating regions, the specified number of operating regions equal to the specified number of operating point clusters. The method includes generating, for each of the specified number of operating regions, an MPC process model according to parameters associated with the operating region, sensing a current state parameter of the at least one component of the process automation plant, and controlling operation of the at least one component of the process automation plant according to the MPC process model associated with the current state parameter.

According to another aspect of the present disclosure, a model predictive control (MPC) device includes an input interface configured to receive an industrial process input associated with at least one component of a process automation plant, an output interface configured to transmit a control instruction to control operation of the at least one component of the process automation plant, and memory configured to store an online model estimation module, and computer-executable instructions. The device includes at least one processor configured to execute the computer-executable instructions to identify at least one current manipulated variable and at least one current process variable of the process automation plant, generate, using the online model estimation module, an MPC process model according to the at least one current manipulated variable and the at least one current process variable of an industrial process of the process automation plant, receive an industrial process input via the input interface, predict, using the generated MPC process model, a future industrial process output according to the received industrial process input, calculate a target operating point according to the predicted future industrial process output, and determine a control signal to drive the industrial process to the calculated target operating point, and output the determined control signal via the output interface to control operation of the at least one component of the process automation plant. Subsequent to outputting the determined control signal, the at least one processor is configured to identify an updated manipulated variable and an updated process variable of the process automation plant, and generate, using the online model estimation module, an updated MPC process model according to at least the updated manipulated variable and the updated process variable of the process automation plant.

Further aspects and areas of applicability will become apparent from the description provided herein. It should be understood that various aspects and features of this disclosure may be implemented individually or in combination with one or more other aspects or features. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
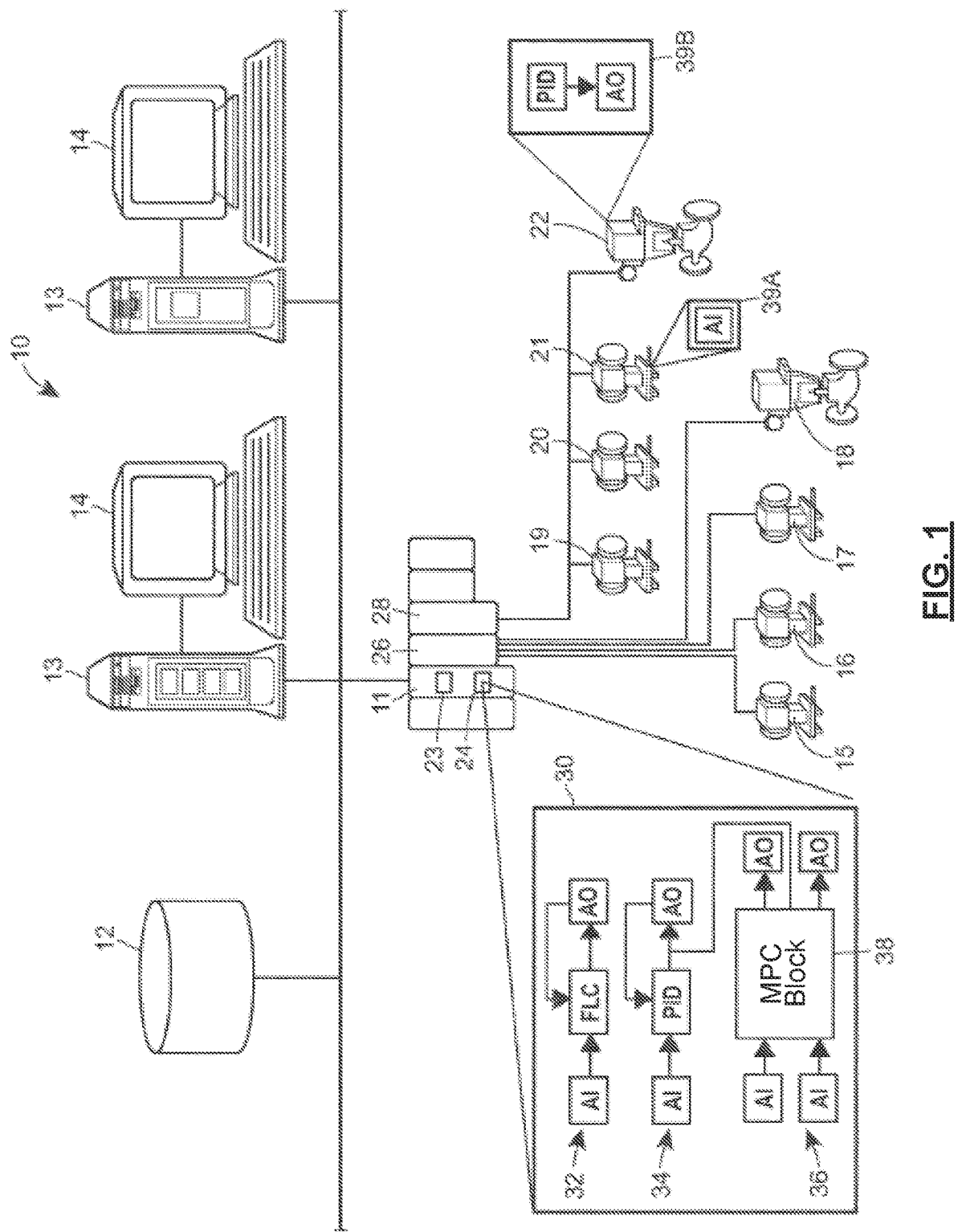
FIG. 1 is a block diagram of a process control system, including one example model predictive control (MPC) device configured to control a process, according one example embodiment of the present disclosure.

Example embodiments will now be described more fully with reference to the accompanying drawings.

Process automation plant systems, such as distributed or scalable process control systems like those used in electrical power generation, chemical, petroleum, or other processes, typically include one or more process control devices, such as a model predictive control (MPC) device. The process control devices may be communicatively coupled to each other, to at least one host or operator workstation via a process control network, and to one or more instrumentation or field devices via analog, digital, or combined analog/digital communication buses.

The field devices perform functions within the process or plant such as opening or closing valves, switching devices on and off, and measuring process parameters. Example field devices include valves, valve positioners, switches, and transmitters (e.g., devices including sensors for measuring temperature, pressure, flow rate, etc., and transmitters for transmitting the sensed temperatures, pressures, flow rates, etc.).

The process control devices, which may be located within the plant environment, are configured to receive signals indicative of process measurements made by the field devices (or other information pertaining to the field devices) and execute a process control application that runs, for example, different process control modules which make process control decisions, generate control signals based on the received information, and coordinate with the control modules or blocks being implemented in smart field devices.

Execution of the control modules may cause the process control devices to send the control signals over the communication links or signal paths to the field devices, to thereby control the operation of at least a portion of the industrial process plant or system (e.g., to control at least a portion of one or more industrial processes running or executing within the plant or system). For example, a first set of process control device(s) and field devices may control a first portion of an industrial process being controlled by the industrial process plant or system, and a second set of process control device(s) and field devices may control a second portion of the industrial process.

The network formed by one or more process control devices, the field devices communicatively connected to the one or more process control devices, and the intermediary nodes facilitating communication between the process control devices and field devices, may be referred to as an "I/O network" or "I/O subsystem."

Information from the I/O network(s) may be made available over a data highway or communication network (the "process control network") to one or more other hardware devices, such as operator workstations, personal computers or computing devices, handheld devices, data historians, report generators, centralized databases, or other centralized administrative computing devices that are placed in control rooms or other locations away from the harsher field environment of the plant, e.g., in a back-end environment of the industrial process plant.

The information communicated over the process control network enables an operator or a maintenance person to perform desired functions with respect to the industrial process via one or more hardware devices connected to the network. These hardware devices may run applications that enable an operator to, e.g., change settings of the process control routine(s), modify the operation of the control modules within the process control devices or the smart field devices, view the current state of the process or status of particular devices within the industrial process plant, view alarms generated by field devices and process control devices, simulate the operation of the industrial process for the purpose of training personnel or testing the process control software, diagnose problems or hardware failures within the industrial process plant, etc. The process control network or data highway utilized by the hardware devices, controllers, and field devices may include a wired communication path, a wireless communication path, or a combination of wired and wireless communication paths.

As one example, the DeltaV™ control system and Ovation™ distributed control system (DCS) sold by Emerson each includes multiple applications stored within and executed by different devices located at diverse places within an industrial process plant. A configuration application, which resides in one or more workstations or computing devices, typically in a back-end environment of a process control system or plant, enables users to create or change process control modules and download these process control modules via a data highway to dedicated distributed controllers.

These control modules may include communicatively interconnected function blocks, which are objects in an object-oriented programming protocol that (i) perform functions within the control scheme based on inputs thereto and (ii) provide outputs to other function blocks within the control scheme. The configuration application may also allow a configuration designer to create or change operator interfaces which are used by a viewing application to display data to an operator and to enable the operator to change settings, such as set points, within the process control routines.

Each dedicated process control device (and, in some cases, one or more field devices) may be configured to store and execute a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc.

A data historian application may be stored in and executed by a data historian device that collects and stores some or all of the data provided across the data highway, while a configuration database application may run in another computer attached to the data highway to store the current process control routine configuration and data associated therewith. Alternatively, the configuration database may be located in the same workstation as the configuration application.

In addition to process control devices, input/output devices (such as I/O cards), and field devices, a typical process control system may include many other supporting devices which are also used for, or related to, industrial process operation. These additional devices include, for example, power supply equipment, power generation and distribution equipment, rotating equipment such as turbines, etc., which are located at numerous places in a typical industrial process plant.

Example process control devices may include proportional-integral-derivative (PID) controllers, model-based controllers such as model predictive control (MPC) controllers, etc. Each of these process control devices can control an industrial process, which may be characterized as having one or more process outputs (e.g., a flow, pressure, temperature, composition, humidity, opacity, density measurement, etc.), and one or more process inputs (e.g., valve positions, flow rates, etc.). Model-based controllers may implement more effective control than traditional controllers when controlling a complex process. This can be attributed, at least in part, to a model-based controller's ability to predict future states of the process being controlled.

Traditional controllers typically manipulate a process input (which may be referred to as a "manipulated variable") to change a process output (which may be referred to as a "controlled variable" or simply a "process variable"), based on feedback (e.g., a measurement of the controlled variable) and a desired value for the process output (e.g., a setpoint).

Model-based controllers (e.g., model predictive controllers or MPCs), such as those described herein, have an advantage in that a model-based controller can predict future states of the industrial process based on a process model representing the dynamic relationships between the process inputs and process outputs of the industrial process being controlled. A model-based controller can implement control based not only on feedback and desired values for process outputs, but based also on predicted future values of process outputs that the controller predicts or anticipates based on the process model and measurements of process outputs. Accordingly, a model-based controller can account for potential future events, and can be especially effective for controlling complex industrial processes that have significant multi-variable interaction (e.g., where a change in a single manipulated variable or process output influences the value(s) of multiple other process outputs).

While model-based controllers provide a number of desirable performance characteristics, the process control industry has been slow to fully adopt model-based control techniques. This limited adoption can be attributed, at least in part, to the fact that model-based controllers typically rely on an accurate process model to implement effective control of the industrial process. Unfortunately, industrial process characteristics often change over time. If a model-based controller continues using an old process model for an industrial process that has changed, the model-based controller's performance can fall off rapidly due to process model mismatch (e.g., the characteristics of the process model do not match the characteristics of the process being controlled). To avoid this performance drop off, process model mismatch generally needs to be avoided or corrected.

Typically, a model-based controller corrects for process model mismatch by generating a new process model during a model identification or generation procedure so that the new process model matches the current characteristics of the industrial process. As noted above, a process model used by a model-based controller generally represents the dynamic relationships between the inputs and outputs of the industrial process being controlled. These dynamic relationships may be captured during a model generation procedure that involves (i) introducing known disturbances or upsets into the industrial process by changing one or more manipulated variables, and (ii) observing how the industrial process reacts to the changes to the manipulated variables, sometimes referred to as "perturb and observe".

When the industrial process finishes responding to the changes to the manipulated variables and reaches a steady state, the process control device can generate a process model, based on the relationship between the changes to the manipulated variables and the observed process response. The process control devices may then resume normal control utilizing the new (and likely more accurate) process model.

In some example embodiments, model generation may take a long time for certain slow processes where a process variable may take minutes, hours, or even days to reach a set point or final resting value. Moreover, a model-based controller may need frequent model regeneration because the characteristics of an industrial process may change often over time due to failing or degrading equipment, atmospheric changes, changes in raw materials, etc. Process control devices may be configured to transmit controller outputs to field devices at fairly regular intervals (e.g., every few seconds to every few minutes). A model-based controller may be designed with a goal of developing accurate predictions for a number of current/future time intervals.

A process control system 10, such as that illustrated in FIG. 1 may be used to implement a multiple model-based control methodology to control a process. The controlled process may be any suitable process, and may be said to have one or more "process outputs" characterizing the state of the process (e.g., tank levels, flow rates, material temperatures, etc.) and one or more "process inputs" (e.g., the state of various environmental conditions and devices such as actuators, the manipulation of which may cause process outputs to change).

In the example of FIG. 1, the process control system 10 includes an MPC device 11 connected to a database 12 (such as a data historian), and to one or more host workstations or computers 13 (which may be any type of personal computers, workstations, tablets, mobile devices, etc.), each having a display 14. The MPC device 11 is also connected to field devices 15-22 via input/output (I/O) devices 26 and 28 (e.g., I/O cards).

The database 12 may be any suitable type of data collection unit having any suitable type of memory and any desired software, hardware and/or firmware for storing data. The MPC device 11 is, in FIG. 1, communicatively connected to the field devices 15-22 using a hardwired communication network and communication scheme and/or a wireless communication network scheme.

Generally, the field devices 15-22 may be any types of devices, such as sensors, valves, transmitters, positioners, etc., while the I/O cards 26 and 28 may be any types of I/O devices conforming to any desired communication or controller protocol. The MPC device 11 includes at least one processor 23 that implements or oversees one or more process control routines (or any module, block, or subroutine thereof) stored in a memory 24.

The MPC device 11 may be configured to communicate with the devices 15-22, the host computers 13 and the database 12 to control an industrial process in any desired manner. Moreover, the MPC device 11 may implement a control strategy or scheme using function blocks, where each function block is an object or other part (e.g., a subroutine) of an overall control routine that operates in conjunction with other function blocks (via communications called links) to implement process control loops within the process control system 10.

Function blocks may be configured to perform one or more of an input function, such as that associated with a transmitter, a sensor or other process parameter measurement device, a control function, such as that associated with a control routine that performs a PID, an MPC, a fuzzy logic, etc. control technique, and an output function which controls the operation of some device, such as a valve, to perform some physical function within the process control system 10. In other example embodiments, hybrid and other types of function blocks may be utilized. The function blocks may be stored in and executed by the MPC device 11 or other devices.

As illustrated by the exploded block 30 of FIG. 1, the MPC device 11 may include a number of single-loop control routines, illustrated as control routines 32 and 34, and, if desired, may implement one or more advanced control loops, illustrated as control loop 36. Each control loop may be referred to as a control module.

The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, measurement devices such as temperature and pressure transmitters, and/or other device(s) within the process control system 10.

The advanced control loop 36 is illustrated as including an MPC block or routine 38 having inputs communicatively connected to one or more AI function blocks, and outputs communicatively connected to one or more AO function blocks, although the inputs and outputs of the MPC block 38 may be connected to any other desired function blocks or control elements (e.g., DI blocks, DO blocks, etc.) to receive other types of inputs and to provide other types of control outputs.

The MPC block 38 may implement any suitable MPC control technique, including any type of multiple-input, multiple-output control scheme, a process model-based control routine, etc., and thus may constitute or include a model predictive control (MPC) block, a neural network modeling or control block, a multi-variable fuzzy logic control block, a real-time-optimizer block, etc.

The function blocks illustrated in FIG. 1, including the MPC block 38, may be executed by the MPC device 11 or, alternatively, may be located in and executed by any other processing device or control element of the process control system 10, such as one of the workstations 13 or one of the field devices 15-22. As one example, the field devices 21 and 22, which may be a transmitter and a valve, respectively, may execute control elements for implementing a control routine and, as such, may include processing and other components for executing parts of the control routine, such as one or more function blocks. The field device 21 may include a memory 39A for storing logic and data associated with an analog input block, and the field device 22 may include an actuator having a memory 39B for storing logic and data associated with a PID, an MPC or other control block in communication with an analog output (AO) block, as illustrated in FIG. 1.

As noted, the MPC device 11 may implement the MPC block 38 to implement model-based control. The industrial process controlled by the MPC device 11 (sometimes simply referred to as "controller 11") may be characterized by a set of process variables or PVs. The PVs may include: (i) manipulated variables or MVs that are manipulated by the PC device 11 (e.g., valve positions) via controller outputs; (ii) controlled variables or CVs that are indirectly controlled by way of adjusting the MVs (e.g., a water tank temperature that is controlled by adjusting a valve position for a cold water inlet valve); (iii) auxiliary variables or AVs that may be indirectly impacted by changes in CVs or MVs (e.g., a water tank level); and (iv) disturbance variables or DVs (e.g., an ambient temperature of the room may slightly impact the water tank temperature). When implementing model-based control (e.g., in a constrained or unconstrained solution mode), the MPC device 11 may use all CV measurements to calculate all MVs simultaneously.

In one example embodiment, the MPC device 11 may be configured to operate according to a scan period control period, such as a scan period k (e.g., 1 minute). At every instant k (e.g., every minute), the MPC device 11 receives controller inputs carrying measured PVs (e.g., CVs and/or AVs). Based on the current measured values, the controller relies on a process model to predict future values of PVs and to develop a "move plan" for the MVs to help drive the CVs and/or AVs to desired values. At the end of the scan period, the MPC device 11 transmits the MV values in the move plan to field devices (e.g., valve actuators) via control signals or controller outputs. Then, during the next scan period, the MPC device 11 again receives the measured PVs and repeats the process.

As described herein, a "move plan" may refer to a set of values for a set of MVs, controlled by the MPC device 11, to be implemented at the end of each scan period. Whether in a constrained or an unconstrained solution mode, the MPC device 11 may calculate, during each scan period, a series of move plans extending into the future (e.g., for use in future scan periods).

A "bounded move plan" may include a set of MVs that do not result in any immediate constraint violations (e.g., the MV values do not violate any MV constraints, and the predicted response of corresponding CVs or AVs will not immediately violate a constraint). An "unbounded move plan" may be generated without concern for constraints, and thus may include MV values that violate MV constraints or that result in other constraint violations (e.g., of CVs or AVs). In some example embodiments, future move plans after the first move plan may not be implemented because the MPC device 11 may recalculate the series of move plans at every scan as part of a calculation of an optimal solution.

"Optimization" may occur by developing a "solution" to an "objective function." The "objective function" may be a formula that may be solved to determine any useful metric (e.g., often profit). One example objective function might be the formula "profit=24x+20y," where x is a first type of widget and y is a second type of widget. The optimal solution may be found by minimizing or maximizing the objective function, depending on the nature of the objective function (in the previous example, the goal would be maximizing profit). Identifying an optimal solution may involve evaluating numerous candidate solutions.

As described herein, a "solution" to an optimization problem or objective function may refer to a solution developed by an optimizer algorithm or routine, which may be implemented by the MPC device 11 or a computing device in communication with the MPC device 11. A "solution" may be characterized as a set of target values for a set of PVs at a steady state operating point of the industrial process at the end of a control or prediction horizon of the MPC device 11, as well as a set of values for the PVs (e.g., for the MVs, CVs, and AVs) at every controller scan or controller interval between the current state of the process and the end of the horizon. The "prediction horizon" may represent the number of scans into the future that are evaluated by the optimizer, while the "control horizon" represents the number of scans into the future for which MV values are predicted to be output. The control horizon may represent the number of assumed "move plans" for the MVs to be evaluated.

As one example, if the prediction horizon is ten and the control horizon is five, the solution may include ten sets of target values for the PVs (including five move plans to be implemented over the next five scans, wherein each move plan includes a set of values for the MVs). The MPC device 11 may develop either or both "unconstrained solutions" and "constrained solutions," sometimes simultaneously.

During unconstrained solution optimization, the MPC device 11 may be configured to generate controller outputs (carrying MV values to field devices) based on the first move plan included in an unconstrained solution. The MPC device 11 may develop the unconstrained solution by feeding the following to an optimizer: (i) a pre-generated process model (which may be generated off-line) that was generated to model the process at the time of generation; (ii) current process variable values; and (iii) one or more control objectives. The optimizer may be configured to identify a solution to the objective function to reach steady state values for the process variables, as well as target values for the process variables after each of a number of "moves" to be implemented by the MPC device 11. The MPC device 11 then identifies the first "move plan" from the solution (which includes a set of desired values for manipulated variables) and "bounds" a set of desired values in the first move plan if any of the values violates a constraint or would result in a violation of a constraint (e.g., of a CV or AV). The MPC device 11 may then transmit controller output signals carrying the "bounded" values of the first move plan to field devices to implement control of the process.

Constrained solution optimization may offer superior control when conditions are appropriate. During constrained solution optimization, the MPC device 11 may be configured to generate controller outputs by (i) developing a process model in real-time when possible, and (ii) feeding the optimizer the following: (a) the current process model with current process variable values; (b) control objectives; and (c) the constraints of all process variables (e.g., CVs, AVs, MVs, and DVs).

The optimizer may be configured to generate a constrained solution (e.g., including target CVs, AVs, and MVs for each scan period) by first calculating the unconstrained solution. Then, the optimizer identifies the first MV to become constrained in time within the series of move plans (e.g., find the earliest MV constraint violation). The allowable portion of the move plan for this MV is then imposed on the problem. Next, the MPC device 11 recalculates the unconstrained solution using the remaining MVs, and the process is repeated until either all MVs are constrained or the unconstrained solution does not violate any constraints. Using this iterative procedure, a set of controller outputs that will not result in constraint violations is identified. This process is computationally intensive, particularly compared to an unconstrained solution mode during which the MPC device 11 calculates relatively simple solutions requiring relatively short on-line execution time.

Constrained solution optimization has at least two advantageous features. First, the control matrix or model may be generated on-line at each control cycle. All dependent variables (e.g., CVs and AVs) are included in a dynamic matrix in the move calculation. A Penalty on Error (PE) for each dependent variable is adjusted at each control cycle. If a CV is far from the limits, its PE can be set to zero to effectively remove it from a dynamic control problem. Conversely, if a CV is near a limit, the full value of the PE may be used. A dynamic move calculation at each control cycle may include only those CVs that are near their limits, and may exclude those that are far from their limits.

A second advantage is the enforcement of MV constraints on the future move plan. This inhibits or prevents the MPC device 11 from planning moves that cannot be implemented. As noted, the general approach is to first calculate the unconstrained MV solution. The second step is to find the first MV to become constrained in time (e.g., find the earliest MV constraint violation). The allowable portion of the move plan for this MV is then imposed on the problem. Next, the unconstrained solution using the remaining MVs is calculated and the process may be repeated until either all MVs are constrained or the unconstrained solution does not violate any constraints.

Figure 2:
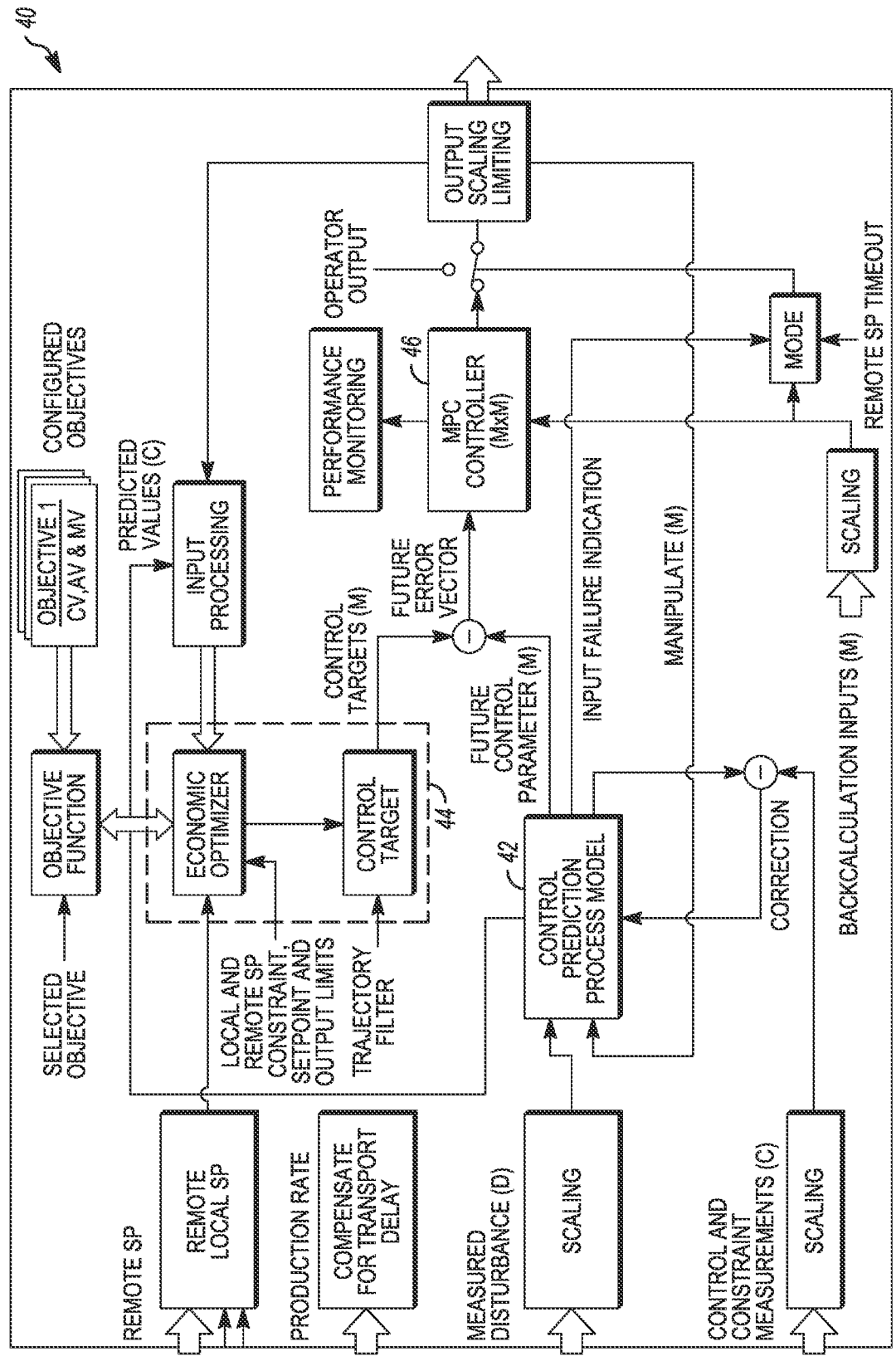
FIG. 2 is a block diagram of one example MPC device, according to another example embodiment of the present disclosure.

FIG. 2 illustrates a block diagram of one example MPC device 40. As shown in FIG. 2, the MPC device 40 includes multiple function blocks for implementing model predictive control of an industrial process, such as an industrial process of a process automation plant (e.g., an industrial process plant).

A prediction block 42 may be configured to use a linear model of an industrial process (such as a steady-state model obtained by step tests and downloaded offline to the MPC device 40), and a history of changes in the process inputs (e.g., as stored in the database 12), to predict future behavior of process outputs if no corrective control action is taken. "Offline" may refer to generation of models on a device separate from the MPC device 40, generation of models while the MPC device 40 is not actively controlling a process or on a device that is not in communication with the MPC device 40 while it is controlling a process, etc. The prediction block 42 may facilitate the predictive ability of the MPC device 40, based on one or more predictive models.

A linear optimizer block 44 may be configured to use predicted steady state process values, operating limits, priorities process economics, etc., to calculate a desired or optimal operating point at each control cycle. For example, "optimization" may occur by developing a solution to an objective function. The objective function may be a formula that may be solved to determine any useful metric (e.g., often profit). The optimal solution may be found by minimizing or maximizing the objective function, depending on the nature of the objective function.

A dynamic move calculation block 46 may be configured to calculate a future control strategy based on a linear model (e.g., the linear model from the prediction block 42). The future control strategy may be configured to drive the industrial process to an optimal operating point (which may be determined by the linear optimizer block 44), and substantially maintain the industrial process at the optimal operating point in the face of disturbances.

In some example embodiments, step tests may be conducted to generate data used for generating a steady-state model. The steady-state model may be used for model prediction and dynamic move calculation, such as by the prediction block 42 and the dynamic move calculation block 46. However, some industrial processes such as chemical processes may be dynamic and nonlinear, and MPC models based on a single steady-state model may fail to obtain desired performance for dynamic and nonlinear industrial processes.

To address this issue, in some example embodiments, a scale factor for model gain may be provided for a user to tune a model, in order to improve nonlinear process control performance. In addition to the scale factor for model gain (K), two extra scale factors may be provided, for model dead time ($\theta$) and model time constants (r), so that the user can better tune the model.

Figure 3:
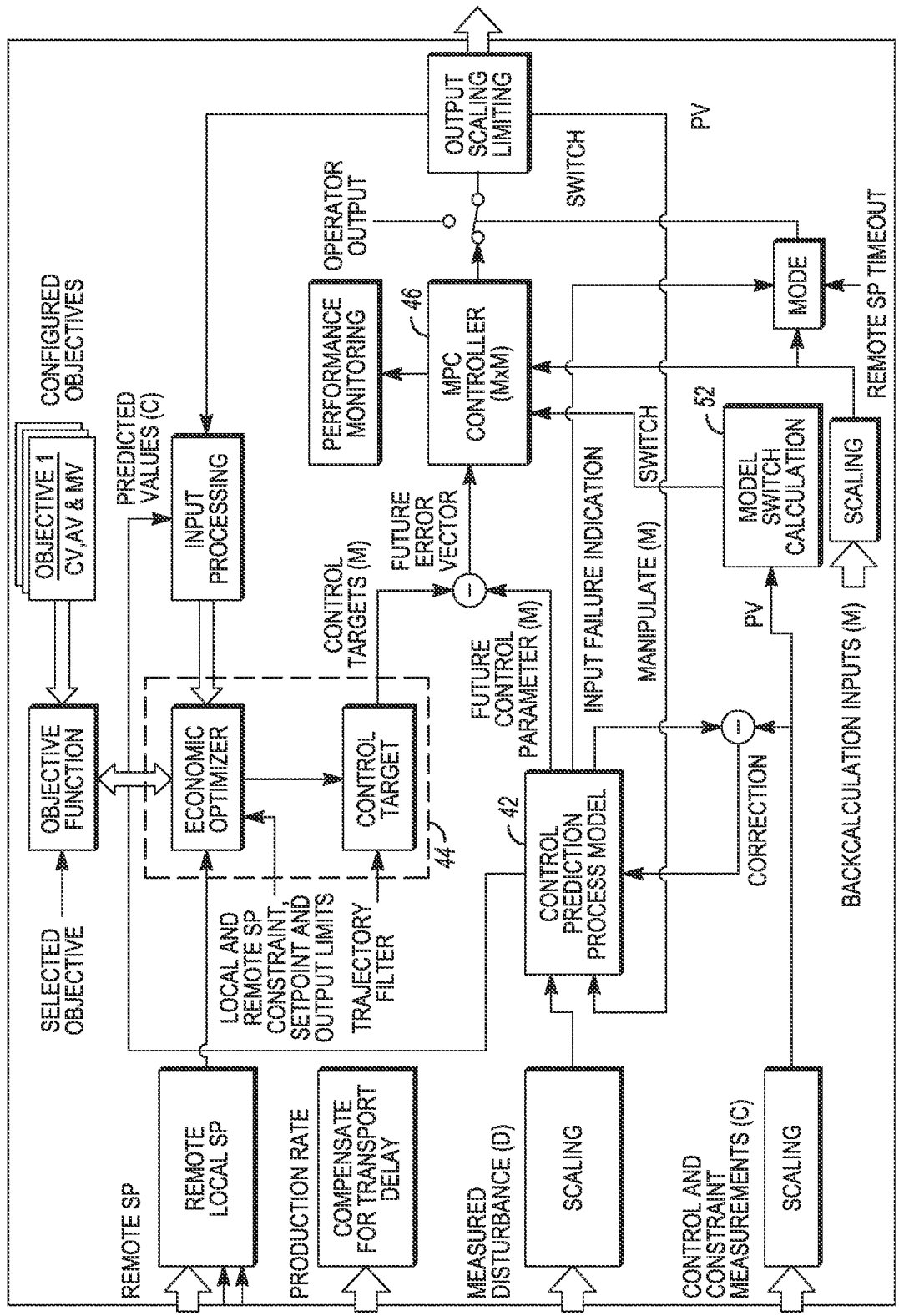
FIG. 3 is a block diagram of one example MPC device including a model switch calculation module.

For example, FIG. 3 illustrates one example MPC device 50 including a model switch calculation module 52. The model switch calculation module 52 may be configured to allow the MPC device to switch between multiple different MPC models. For example, the MPC device 50 may include multiple different MPC models, and the model switch calculation module 52 may be configured to switch operation of the MPC device 50, such as by switching at least one of the prediction block 42, the linear optimizer block 44 and the dynamic move calculation block 46 to operate using different ones of the multiple MPC models.

The different MPC models may correspond to different operating states of the industrial process or industrial process plant, such as different non-linear points within an operation variable space of the industrial process or industrial process plant. For example, the model switch calculation module 52 may be configured in an automatic mode, where the model switch calculation module 52 uses measured variables of the industrial process to determine when to switch between different models. The model switch calculation module 52 may be configured in a manual mode, where a user is allowed to manually switch between different MPC models for the MPC device 50.

In some example embodiments, the MPC device 50 may be configured to allow users to develop new MPC models, such as new MPC models that are estimated online (e.g., generated on the MPC device 50 itself or another device in communication with the MPC device 50, generating during a period where the MPC device 50 is actively operating to control a process, etc.), and manually add the new MPC models to the set of MPC models available for switching in the MPC device 50. The model switching functionality provided by the model switch calculation module 52 may provide faster and easier tuning of the user-developed models as compared to previous MPC devices, may improve control performance when dealing with nonlinear processes, may be compatible with existing MPC devices such as the DeltaV™ system by Emerson, etc.

Users may be able to modify, tune, update, add, etc. different MPC models for switching in the MPC device 50, using any suitable techniques. For example, a user may adjust model process gain(s), model time constant(s), model dead time(s), etc. In some example embodiments, the MPC device 50 may be configured to execute one or more multiple-input multiple-output (MIMO) models, where at each operating state a set of process gain values, time constant values and dead time values are generated. An MPC process model may implement a MIMO format, such as by having multiple inputs (e.g., uD, uE), and multiple outputs (e.g., y_D, y_E).

A user may manually write new models and include them in the model sets in the MPC device 50, different MPC models may be generated off-line corresponding to different operating modes of the industrial process and downloaded to the MPC device 50, etc. As mentioned above, the models may be switched in the MPC device 50 during operation in an automatic configuration and/or a manual configuration.

Figure 4A:
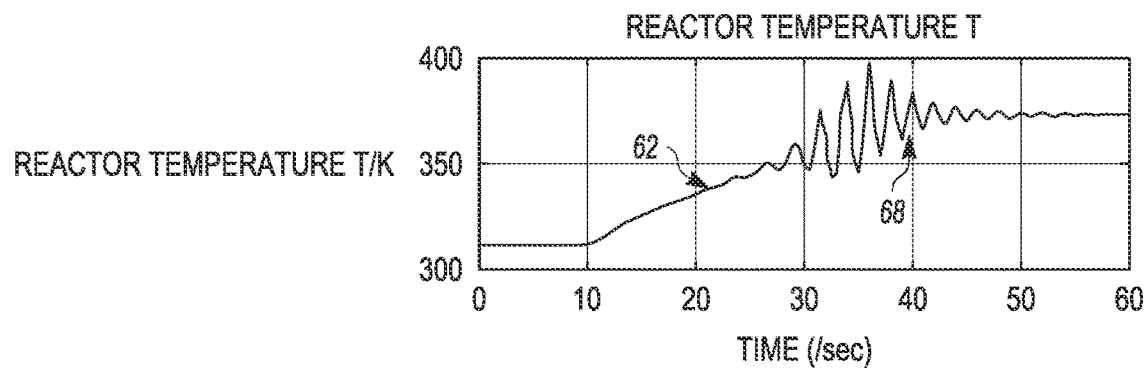
FIG. 4A is one example plot of reactor temperature over time, for one example industrial process controlled by an MPC device having a single steady-state model.

FIG. 4A illustrates one example plot 62 of reactor temperature over time, for one example industrial process controlled by an MPC device having a single steady-state model. As shown in FIG. 4A, the reactor temperature has an unstable closed-loop response as the reactor temperature transitions from its rising value to its final steady-state value, due to the nonlinear behavior of the industrial process around the transition point.

Figure 4B:
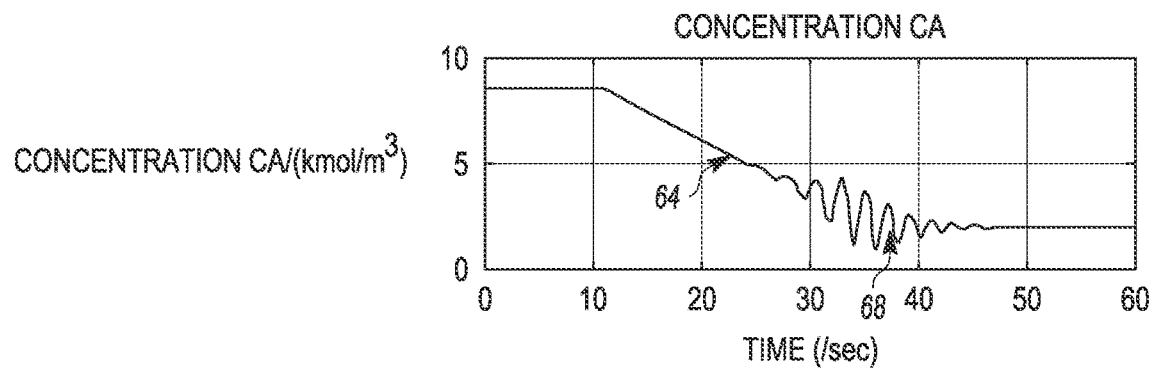
FIG. 4B is one example plot of concentration over time, for the example industrial process controlled by an MPC device having a single steady-state model.

FIG. 4B illustrates one example plot 64 of concentration over time, for the example industrial process controlled by the MPC device having the single steady-state model discussed above with respect to FIG. 4A. As shown in FIG. 4B, the concentration also has an unstable closed-loop response as the concentration transitions from its falling value to its final steady-state value, due to the nonlinear behavior of the industrial process around the transition point.

Figure 4C:
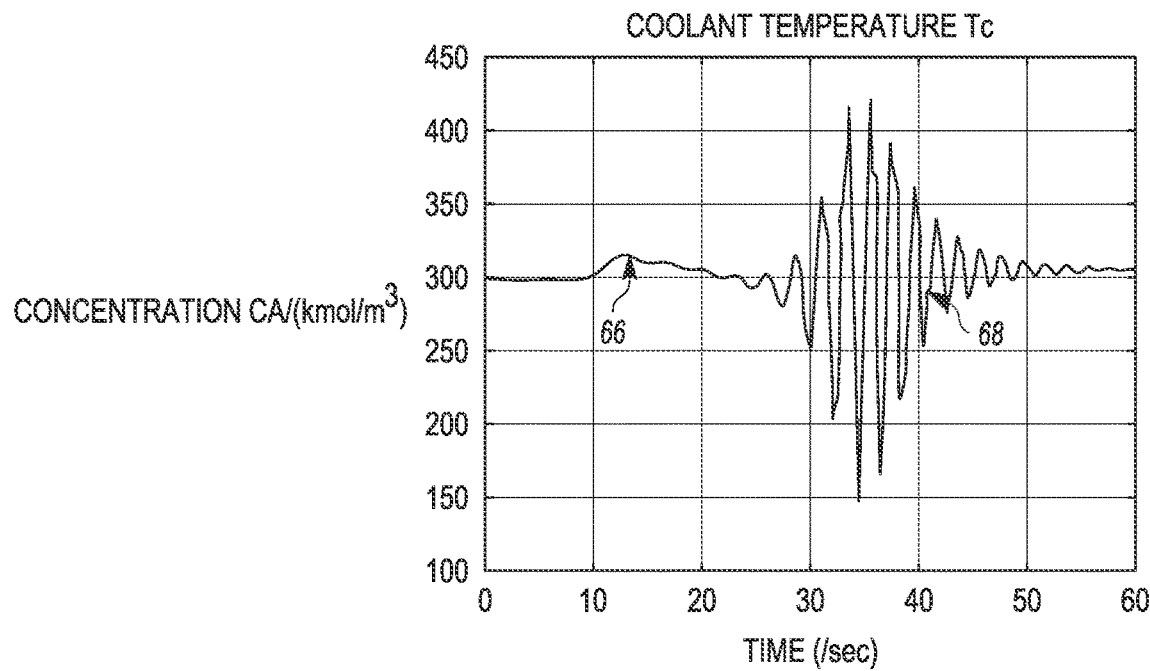
FIG. 4C is one example plot of coolant temperature over time, for the example industrial process controlled by an MPC device having a single steady-state model.

FIG. 4C illustrates one example plot 66 of coolant temperature over time, for the example industrial process controlled by the MPC device having the single steady-state model discussed above with respect to FIG. 4A and FIG. 4B. As shown in FIG. 4C, the coolant temperature also has an unstable closed-loop response corresponding to a location of nonlinear behavior of the industrial process.

Figure 5:
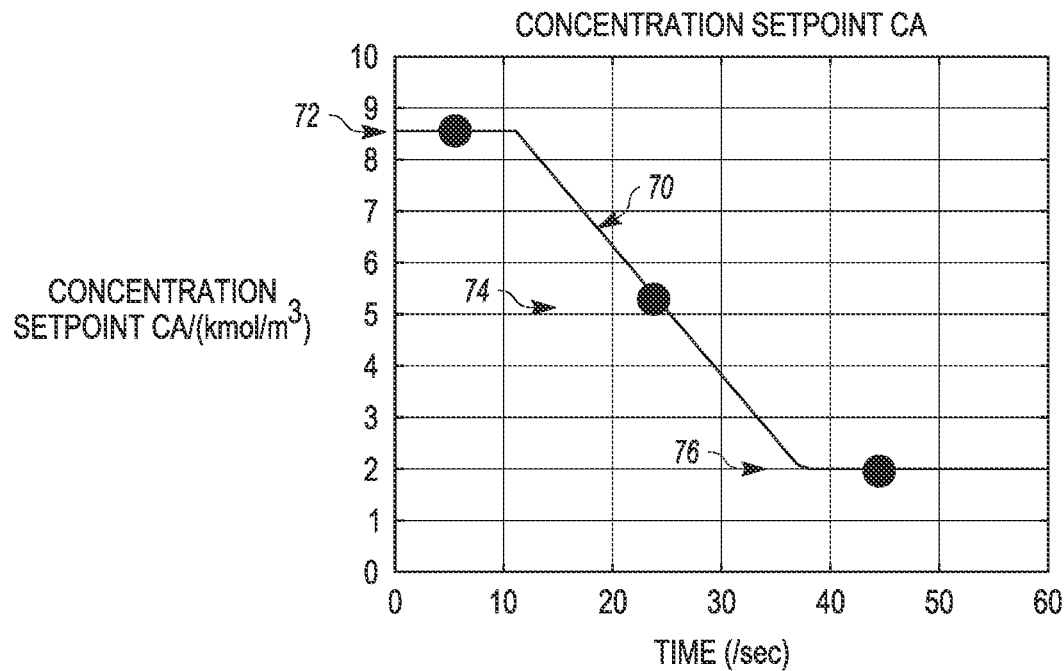
FIG. 5 is one example plot of a concentration setpoint over time, for one example industrial process having multiple operation states.

FIG. 5 illustrates one example plot 70 of a concentration setpoint over time, for one example industrial process having multiple operation states. The industrial process includes three different operation states, which are highlighted by the example points illustrated in FIG. 5. For example, in an initial state 72, the industrial process has a concentration setpoint CA that is greater than or equal to eight.

In a transition state 74, the concentration setpoint CA is less than eight and greater than or equal to three. In the final state 76, the concentration setpoint CA is less than three. In this example, the MPC device 50 may use three different MPC models, each corresponding to one of the different states. For example, a first MPC model may be generated corresponding to operation of the industrial process around the initial state 72, a second MPC model may be generated corresponding to the transition state 74, and a third MPC model may be generated corresponding to the final state 76.

In some example embodiments, the state parameter CA may be used as a gain scheduling parameter to switch between the different models. For example, the model switch calculation module 52 may be configured to obtain a current state parameter CA of an industrial process, and automatically switch the MPC device 50 to operate according to whichever one of the multiple MPC models corresponds to the current state parameter CA.

In the example of FIG. 5, if the current state parameter CA (e.g., concentration) of the industrial process is greater than eight, the model switch calculation module 52 may switch the MPC device 50 to operate using a model corresponding to the initial state 72. If the current state parameter CA of the industrial process is less than eight but greater than three, the model switch calculation module 52 may switch the MPC device 50 to operate using a model corresponding to the transition state 74. If the current state parameter CA of the industrial process is less than three, the model switch calculation module 52 may switch the MPC device 50 to operate using a model corresponding to the final state 76.

Each of the different MPC models may be generated to handle operation of the industrial process according to unique aspects of its associated parameter state, in order to account for nonlinear dynamics of the industrial process (e.g., so that different models are used at different linear and nonlinear operation ranges of the industrial process). In some example embodiments, a current state parameter CA of the industrial process may be displayed to a user, and the user may manually switch an MPC model of the MPC device.

Figure 6A:
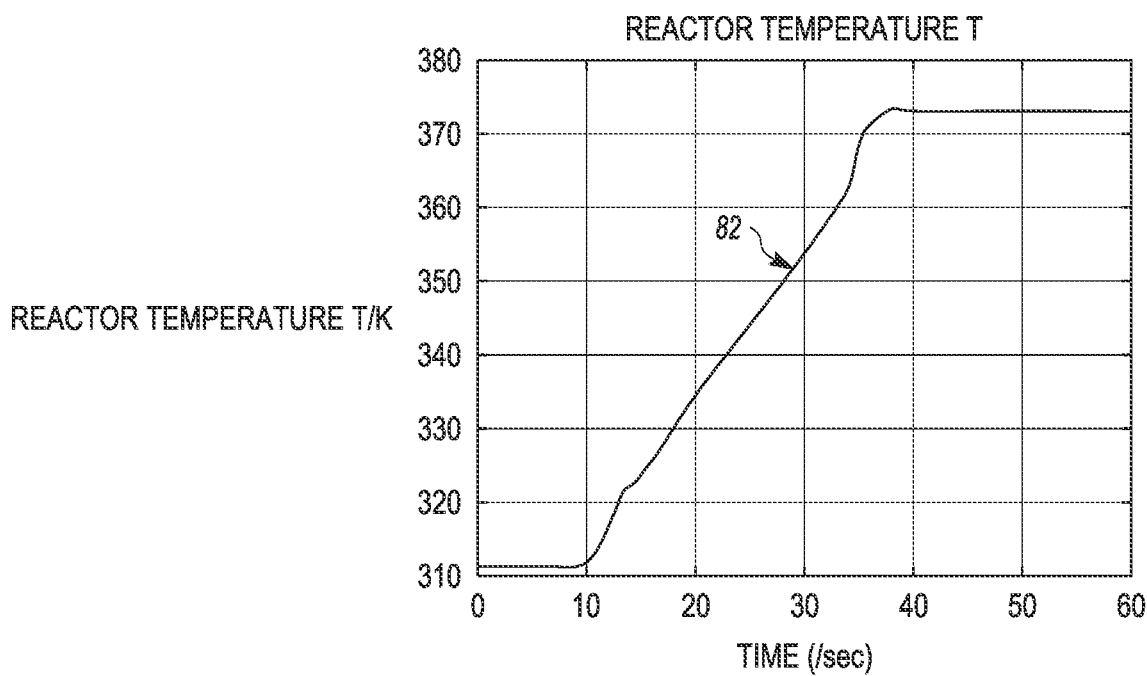
FIG. 6A is one example plot of reactor temperature over time, for one example industrial process controlled by an MPC device configured to switch between multiple models based on a current operating state parameter of an industrial process.
Figure 6B:
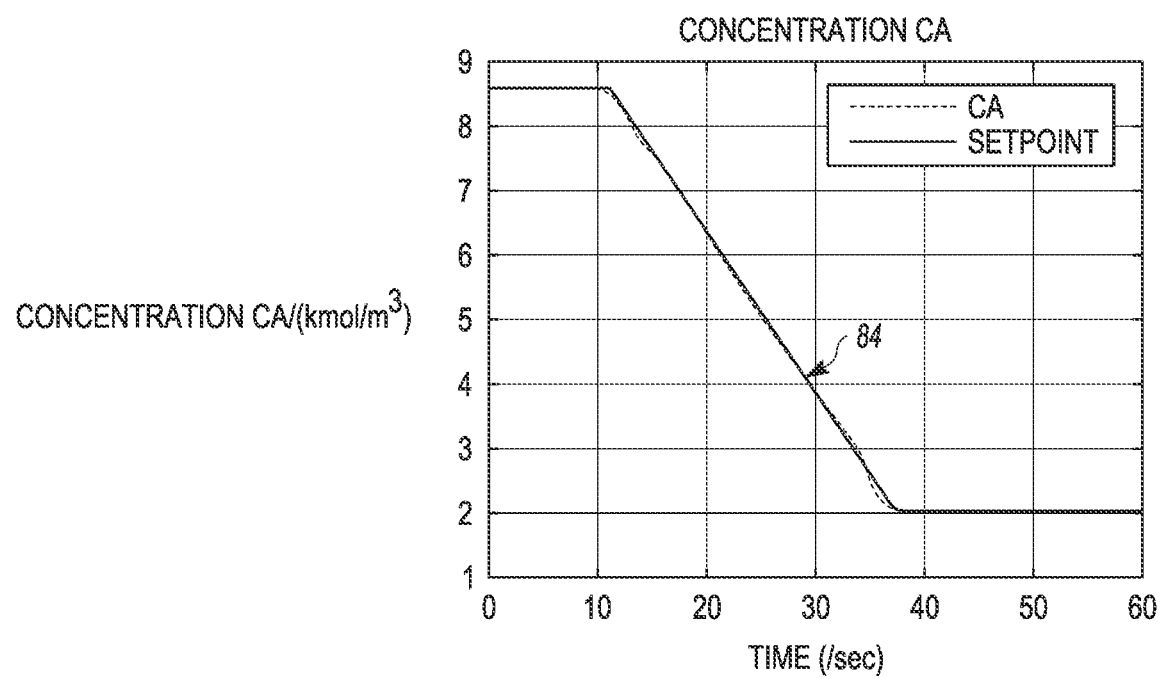
FIG. 6B is one example plot of concentration over time, for the example industrial process controlled by the MPC device configured to switch between multiple models based on the current operating state parameter of the industrial process.
Figure 6C:
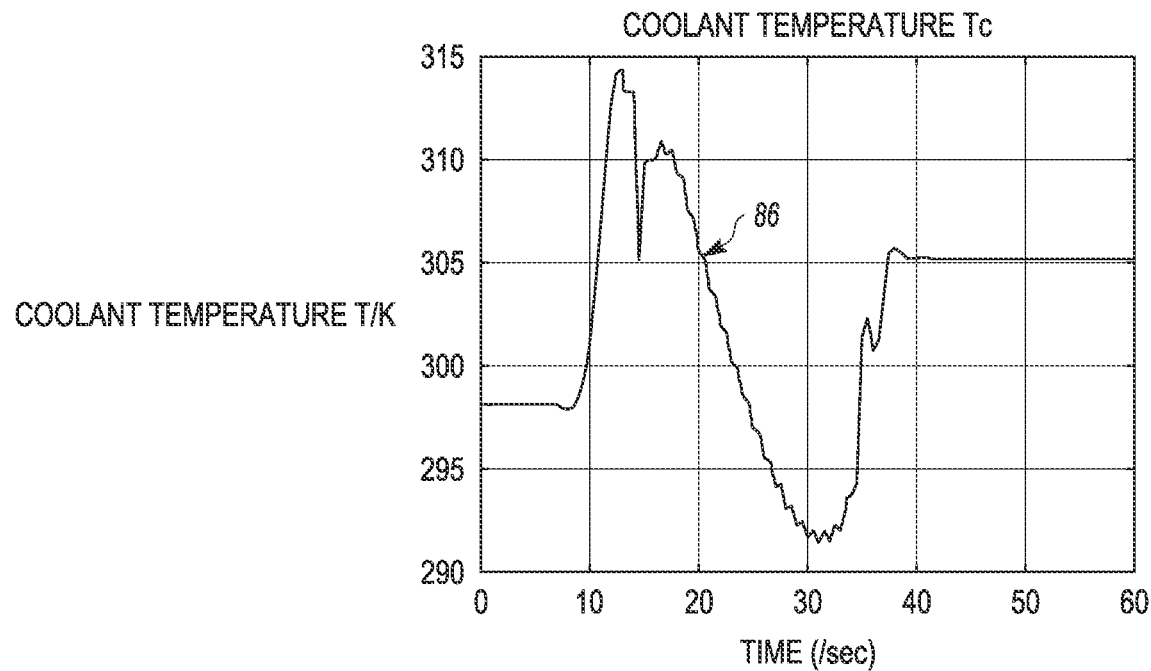
FIG. 6C is one example plot of concentration over time, for the example industrial process controlled by the MPC device configured to switch between multiple models based on the current operating state parameter of the industrial process.

Example plots of parameters of a continuous stirred-tank reactor (CSTR) embodiment are illustrated in FIGS. 6A-C. FIG. 6A illustrates one example plot 82 of reactor temperature over time, for one example industrial process controlled by an MPC device configured to switch between multiple models based on a current operating state parameter of the industrial process. For example, the plot 82 may correspond to the MPC device 50 configured to operate with different models each corresponding to different parameter states of FIG. 5.

As shown in FIG. 6A, the reactor temperature has a much smoother and stable closed-loop response as the reactor temperature transitions from its rising value to its final steady-state value, as compared to the plot 62 in FIG. 4A that is based on the single steady-state model.

FIG. 6B illustrates one example plot 84 of concentration over time, for the example industrial process controlled by the MPC device configured to switch between multiple models based on the current parameter state of the industrial process. As shown in FIG. 6B, the concentration has a much smoother and stable closed-loop response as the reactor temperature transitions from its declining value to its final steady-state value, as compared to the plot 64 in FIG. 4B that is based on the single steady-state model.

FIG. 6C illustrates one example plot 86 of coolant temperature over time, for the example industrial process controlled by the MPC device configured to switch between multiple models based on the current parameter state of the industrial process. As shown in FIG. 6C, the coolant temperature has a much smoother and stable closed-loop response, as compared to the plot 66 in FIG. 4C that is based on the single steady-state model.

In another example embodiment, the MPC device 50 may include an input interface configured to receive an industrial process input associated with at least one component of a process automation plant, such as the industrial process plant of the process control system 10 shown in FIG. 1. The MPC device 50 includes an output interface configured to transmit a control instruction to control operation of the at least one component of the process automation plant.

The MPC device 50 includes memory configured to store a first MPC process model, a second MPC process model, and computer-executable instructions. The first MPC process model includes at least one control parameter different than a control parameter of the second MPC process model, where the at least one control parameter includes one or more of a gain value, a time constant value, and a dead time value.

The MPC device 50 may include at least one processor configured to execute the computer-executable instructions to receive an industrial process input via the input interface, identify a current state parameter of an industrial process of the process automation plant, and predict, using the first MPC process model, a future industrial process output according to the received industrial process input, when the current state parameter has a first state value associated with the first MPC process model.

The processor may be configured via the instructions to predict, using the second MPC process model, the future industrial process output according to the received industrial process input, when the current state parameter has a second state value associated with the second MPC process model. The first state value is different than the second state value. The processor may be configured via the instructions to calculate a target operating point according to the predicted future industrial process output, determine a control signal to drive the industrial process to the calculated target operating point, and output the determined control signal via the output interface to control operation of the at least one component of the process automation plant.

In some example embodiments, the first MPC process model and the second MPC process model may each include a linear steady-state model obtained via step tests. The processor may be configured to switch operation between the first MPC process model and the second MPC process model according to automated detection of a change in the current state parameter (such as changes between the state parameters illustrated in FIG. 5), from the first state value associated with the first MPC process model to the second state value associated with the second MPC process model. In other example embodiments, the at least one processor may be configured to switch operation between the first MPC process model and the second MPC process model in response to a manual input received at the MPC device.

The MPC device 50 may include more (or less) than two different MPC models. For example, the processor may be configured to receive or generate a third MPC process model having at least one control parameter different than the control parameter of the first MPC process model and the control parameter of the second MPC process model. The third MPC process model is associated with a third state value of the process automation plant, the third state value different than the first state value and the second state value, store the third MPC process model in the memory, and predict, using the third MPC process model, the future industrial process output according to the received industrial process input, in response to the current state parameter having the third state value.

The current state parameter may include any suitable parameter(s) associated with an operation state of an industrial process, such as a chemical concentration value, a temperature value, a pressure value, a throughput value, etc. The component of the process automation plant may include any suitable industrial process plant components, such as a continuous stirred-tank reactor. Although some example embodiments described herein use a single state parameter of the industrial process for model switching, in other example embodiments the MPC device 50 may determine operating states using a multivariate approach (such as via clustering as described below).

In the example of FIG. 5, in one example there are three operating states identified for an industrial process: the initial state 72 where the concentration set point is greater than eight, a final state 76 where the concentration setpoint is less than three, and a transition state 74 where the concentration setpoint is between three and eight. Three MPC models may be calculated with each corresponding to an associated one of the three operating states. The state parameter CA (e.g., the concentration setpoint) may be used as a gain scheduling parameter to switch between different models.

In some example embodiments, it may be difficult to define boundaries of operating states of an industrial process based on a single state parameter, such as when the industrial process includes a complex operation relationship between multiple operation state parameters. For example, it may be difficult to identify a single variable which is sufficient to characterize the current operating state of the industrial process. Also, operation states of an industrial process may change over time. For example, the three operating states identified in FIG. 5 are static, and some industrial process plants have dynamic process operations that change over time.

In some example embodiments, clustering techniques may be used to define operating states of an industrial process, such as clustering techniques from an artificial intelligence field. Clustering algorithms, such as those used in the artificial intelligence field, may assist process engineers in determining operating regions.

For example, a user may define m clusters (where m=1, 2, 3, or more), for n state parameters (where n=1, 2, 3, or more). Each cluster may be associated with one operating state of an industrial process. In FIG. 5, the example case includes three clusters (m=3), with one state parameter (n=1).

Figure 7A:
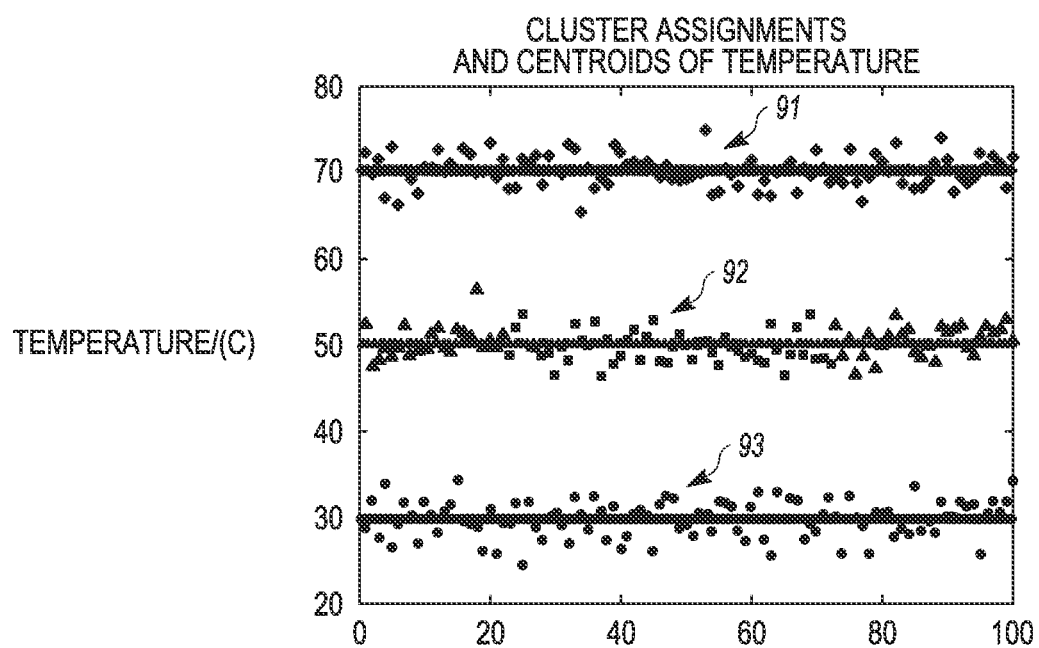
FIG. 7A is one example plot illustrating the generation of three operating state clusters of an industrial process based on a single state parameter.

If there is only one state parameter (n=1), such as temperature for example, the operating points will be scattered around three horizontal lines. One example is illustrated in FIG. 7A, where a first cluster 91 of industrial process operation points is scattered around a horizontal line near seventy degrees Celsius. A second cluster 92 is scattered around a horizontal line near fifty degrees Celsius, and a third cluster 93 is scattered around a horizontal line near thirty degrees Celsius.

In this example, each point in the plot of FIG. 7A may represent a sampled temperature of the industrial process at a different periodic point in time (such as a sample taken every minute, every hour, etc.). The clusters may be identifying by determining temperature regions where the industrial process operates most frequently.

Figure 7B:
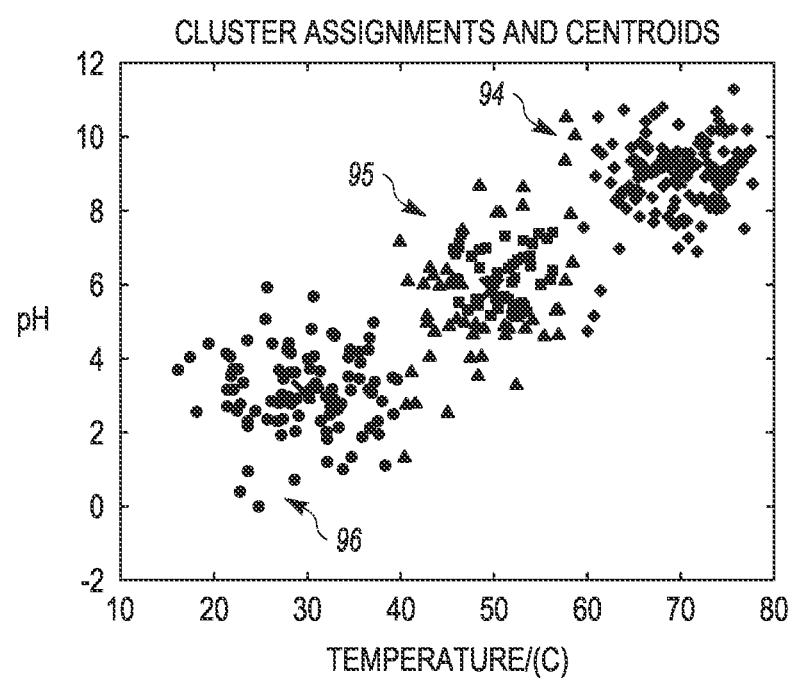
FIG. 7B is one example plot illustrating the generation of three operating state clusters of an industrial process based on two state parameters.

FIG. 7B illustrates one example case where there are two state parameters (n=2), temperature and pH. The operating points of the industrial process are scattered around three clusters. A first cluster 94 includes operating points at a higher temperature near seventy degrees and a higher pH level of nine, a second cluster 95 includes operating points at a medium temperature near fifty degrees and a medium pH level of six, and a third cluster 96 includes operating points near a lower temperature of thirty degrees and a lower pH level of three.

Figure 7C:
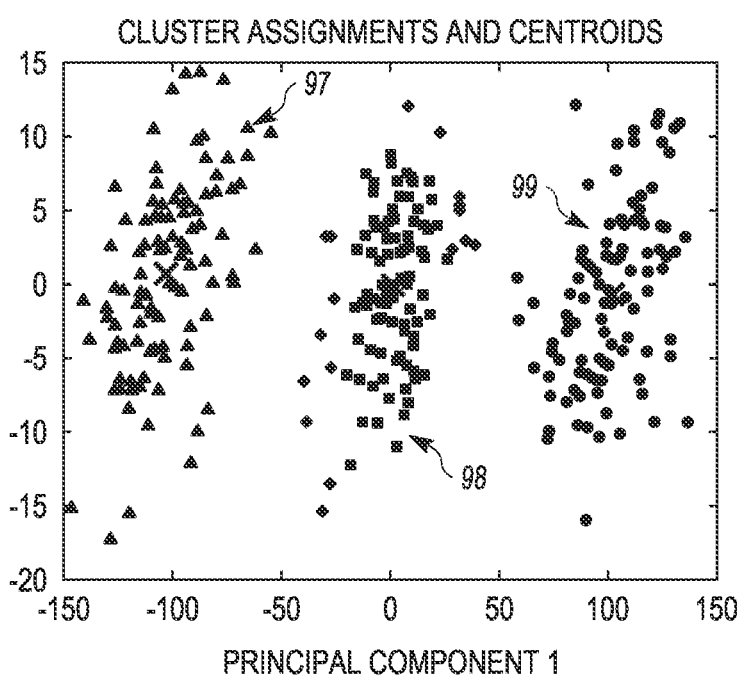
FIG. 7C is one example plot illustrating the generation of three operating state clusters of an industrial process using principal component analysis reduction.

In some example embodiments, such as when there are more than two state parameters (e.g., temperature, pH level and flow rate), a dimension reduction technique such as principal component analysis (PCA) may be applied first as a preprocessing step. The PCA may project the operating state from a multi-dimensional space onto a two-dimensional space spanned by principal components. One example is illustrated in FIG. 7C, where a first cluster 97 includes points having a first principal component value around −100 and a second principal component value around zero, a second cluster 98 includes points having a first principal component value around zero and a second principal component value around zero, and a third cluster 99 includes points having a first principal component value around +100 and a second principal component value around zero.

A model estimation module may be used to estimate process model parameters in each state, such as each operating state of the industrial process identified by a corresponding cluster. Example process model parameters for each state may include, for example, a process gain K, a time constant τ, and dead time θ. One example equation for the process model at each state may be:

$$G_p = \frac{Ke^{-\theta s}}{\tau s + 1} \quad \text{Equation (1)}$$

In some example embodiments, the MPC device may include multiple first-order-plus time-delay/deadtime (FOPTD) response models. For example, four FOPTD models may each be associated with one pair of input/output. Other MPC devices may implement more or less models.

After obtaining multiple models each associated with a corresponding one of the operating state clusters, multiple MPC control strategies may be designed and downloaded to the MPC device (e.g., the MPC device 50). The multiple MPC control strategies and/or MPC models may be switched manually during operation of the MPC device, and/or may be switched automatically such as by applying gain scheduling technology. In some example embodiments, the MPC device may not use a single gain scheduling parameter, such as the concentration setpoint state parameter CA illustrated in FIG. 5.

Use of clustering algorithms may improve functionality of the MPC device by automatically determining dynamic operating regions of the industrial process. This may provide an easier solution for tracking process state changes, and may involve simple implementation for engineers. The clustering algorithm may have a low computational complexity.

Clustering algorithms may allow users may avoid the need to manually identify operating regions of the industrial process (which can be a difficult manual task), and in some cases the engineers may only need to specify a number of clusters m for the clustering algorithm to identify. The MPC device or other part of the process control system may be configured to update dynamic operating regions over time (e.g., in real time or near real time), as the dynamic operating regions may expand or shrink over time. Dynamic operating regions may provide improved process control performance compared to pre-defined static operating regions, for some industrial processes. The number of operating regions may be specified at any suitable number, such as two operating regions, three operating regions, five operating regions, ten operating regions, or more.

Since each model may correspond to a cluster (e.g., an operating state of the industrial process), each model may be updated whenever the clusters are updated (such as to account for dynamic changes in the industrial process over time). In some example embodiments, clustering may be performed on historical data of state parameters to determine preliminary operating regions. Final model parameters may be recorded at each adaptation step, and process engineers may update the clusters (e.g., both a number of clusters and data points for the clusters), after a specified period of operation. A number of values in each cluster may be used to indicate a strength of each cluster.

In some example embodiments, a user interface may display dimensions of the clusters, e.g., in terms of the state parameters or the contributions of each state parameter to each control process or model, after identifying the clusters. This may allow a user to identify a reason for changing or updating models.

In some example embodiments, clustering algorithms may include k-means clustering, density-based spatial clustering of applications with noise (DBSCAN), mean-shift clustering, expectation-maximization (EM) clustering using gaussian mixture models (GMM), agglomerative hierarchical clustering, etc. Other dimensional reduction algorithms may be used, such as kernel PCA, linear discriminant analysis (LDA), t-SNE, etc.

Figure 8:
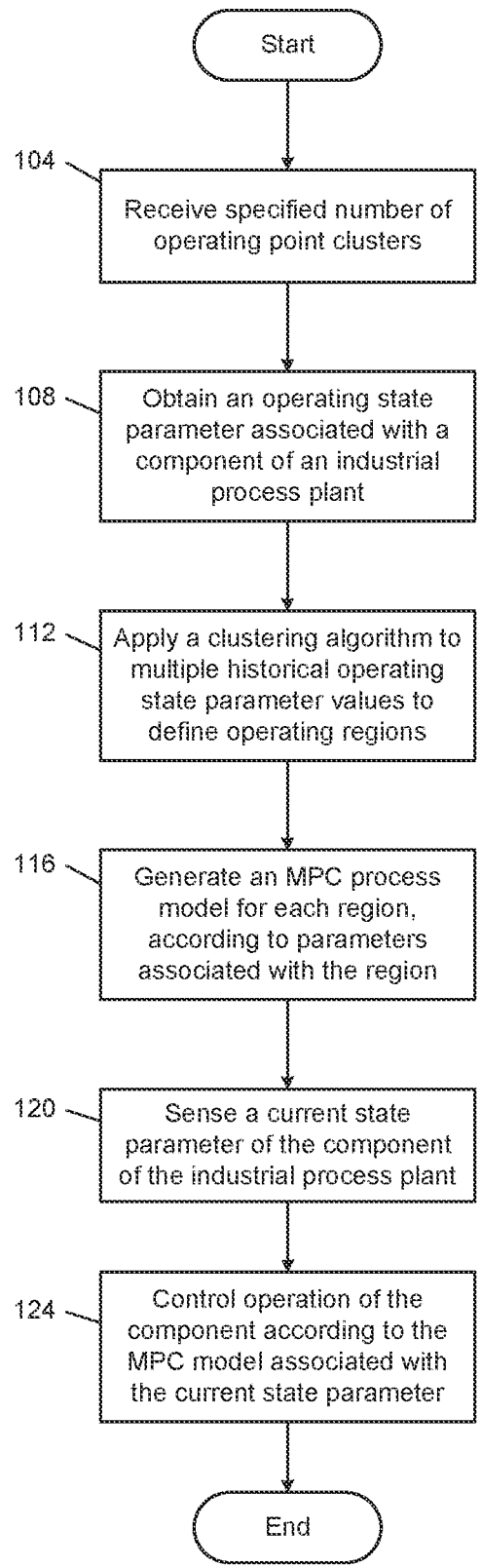
FIG. 8 is a flowchart depicting one example process for determining state parameter clusters for an MPC device of a process automation plant.

FIG. 8 illustrates one example process for determining state parameter clusters for an MPC device of a process automation plant. The process of FIG. 8 may be implemented by, for example, the MPC device 50 and/or other components of the process control system 10.

The process begins at 104, where a controller (such as the MPC device 50) may be configured to receive a specified number of operating point clusters. The controller then obtains at 108, via an input interface, at least one operating state parameter associated with at least one component of the process automation plant. The at least one operating state parameter is obtained at multiple time points during operation of the process automation plant to define multiple historical operating state parameter values.

At 112, the controller is configured to apply a clustering algorithm to the multiple historical operating state parameter values to define a specified number of operating regions. The specified number of operating regions may be equal to the specified number of operating point clusters.

At 116, the controller is configured to generate, for each of the specified number of operating regions, an MPC process model according to parameters associated with the operating region. The controller senses a current state parameter of the at least one component of the process automation plant, at 120. The controller may be configured to control operation of the at least one component of the process automation plant according to the MPC process model associated with the current state parameter, at 124.

In some example embodiments, the process may include, subsequent to generating each MPC process model, obtaining the at least one operating state parameter obtained at multiple additional time points during operation of the process automation plant to define multiple updated operating state parameter values. The clustering algorithm may be applied to the multiple updated operating state parameter values to define the specified number of updated operating regions, and the controller may generate, for each of the specified number of updated operating regions, an updated MPC process model according to parameters associated with the updated operating region.

The clustering algorithm may include any suitable algorithm, such as a k-means clustering algorithm, a density based spatial clustering of applications with noise (DB-SCAN) algorithm, a mean-shift clustering algorithm, an expectation-maximization (EM) clustering algorithm using a gaussian mixture model (GMM), or an agglomerative hierarchical clustering algorithm. Generating an MPC process model may include estimating a process gain value, a time constant value and a dead time value for the MPC process model according to at least a portion of the multiple historical operating state parameter values associated with the operating region of the MPC process model. The current state parameter may include any suitable parameter, such as a chemical concentration value, a temperature value, a pressure value, and a throughput value.

Figure 9:
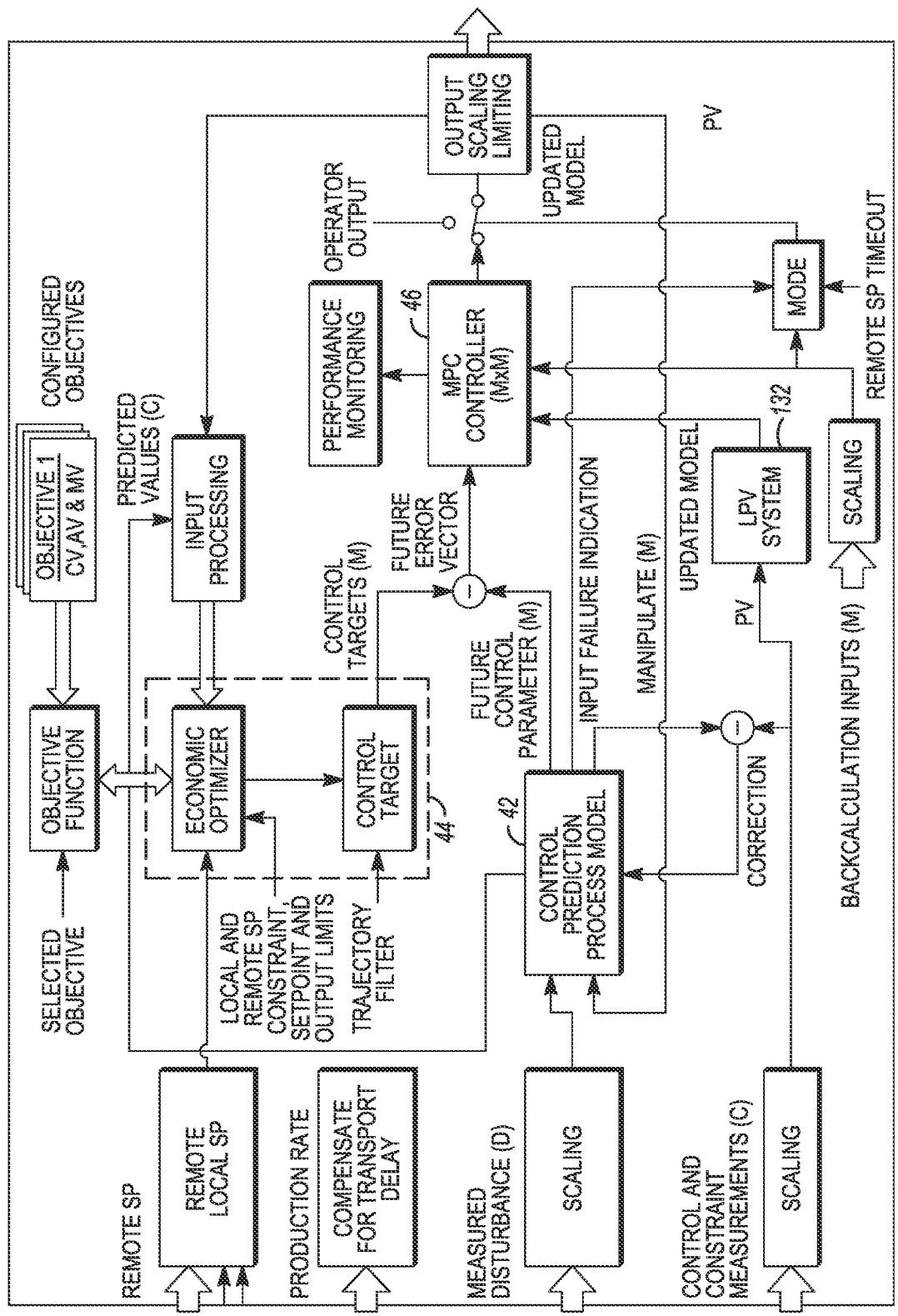
FIG. 9 is a block diagram of one example MPC device including a linear parameter-varying (LPV) module.

FIG. 9 illustrates one example MPC device 130 including a linear parameter-varying (LPV) module 132. The LPV module 132 may be configured to allow the MPC device 130 to operate with automatic gain scheduling using an interpolated array of linear state-space models. For example, the MPC device 130 may be configured to switch operation of at least one of the prediction block 42, the linear optimizer block 44 and the dynamic move calculation block 46, based on selected points in a scheduling space that form a regular grid (such as the LPV grid 140 illustrated in FIG. 10).

A state-space model (e.g., an MPC model) at each point 142 in the LPV grid 140 may represent dynamics of the industrial process in the local vicinity of that point. Dynamics at scheduling locations in between the grid points 142 may be obtained by interpolation of neighboring points 142. In some example embodiments, an interpolated model may be used by the MPC device 130 in real time, while state-space models at each of the grid points 142 may be generated and obtained off-line.

In some example embodiments, the MPC device 130 may be configured to allow users to estimate new MPC models online, and manually add the new MPC models to a set of models used by the MPC device 130. For example, users may be able to calculate/write new MPC modes and include them in the model sets used by the MPC device 130. The different MPC models may be generated off-line to correspond to different operating nodes, and then downloaded in the MPC device 130.

Figure 10:
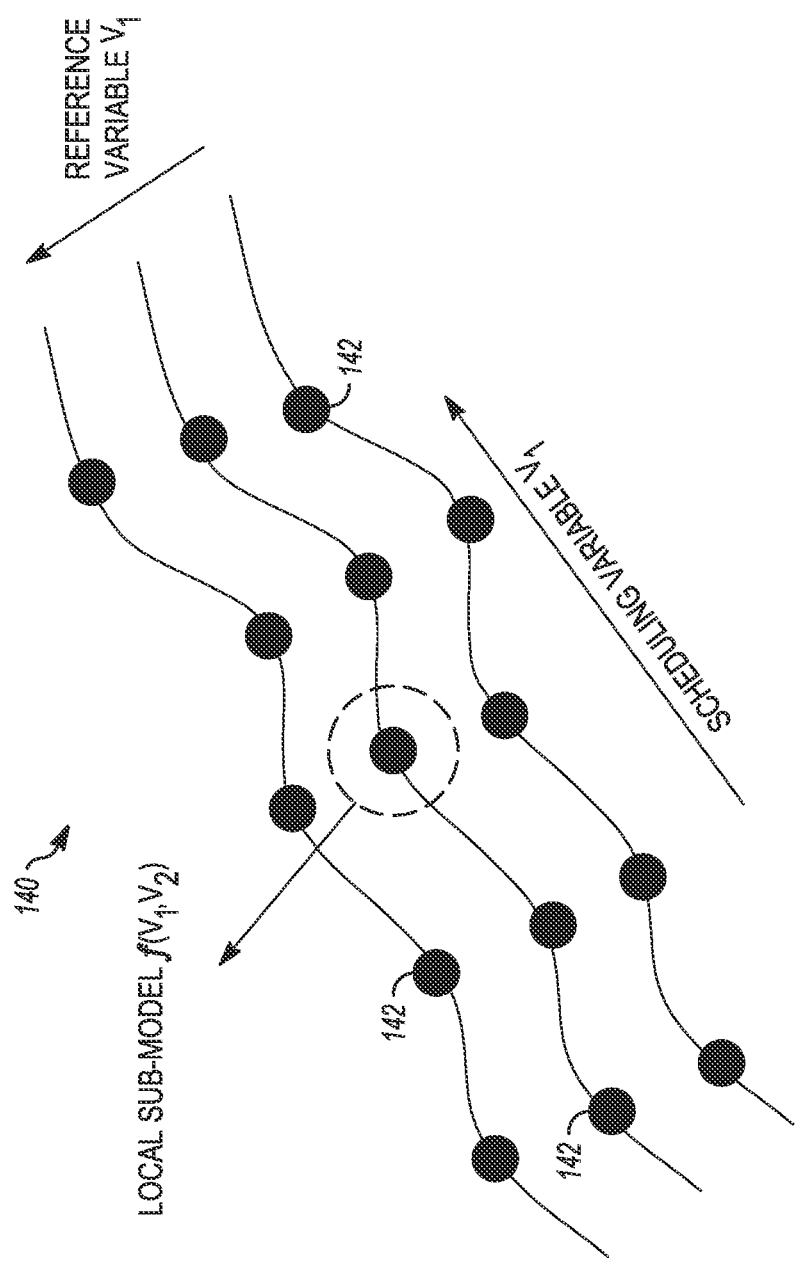
FIG. 10 is a diagram of one example interpolated array of linear state-space models, including a number of grid points in a scheduling space.

As illustrated in FIG. 10, one example interpolated array 140 of linear state-space models may include a number of grid points 142 in the scheduling space, which may form a grid. The number of points may be specified ahead of time, and may correspond to a number of points along a scheduling variable V1 (such as a temperature T), and a reference variable V2 (such as a concentration setpoint CA). The dynamics at scheduling locations in between the grid points 142 may be obtained by interpolation of at neighboring points 142. In one example, a reactor temperature T may be used as the scheduling variable, while three concentration setpoint values as a reference variable may represent different operating stages.

Figure 11A:
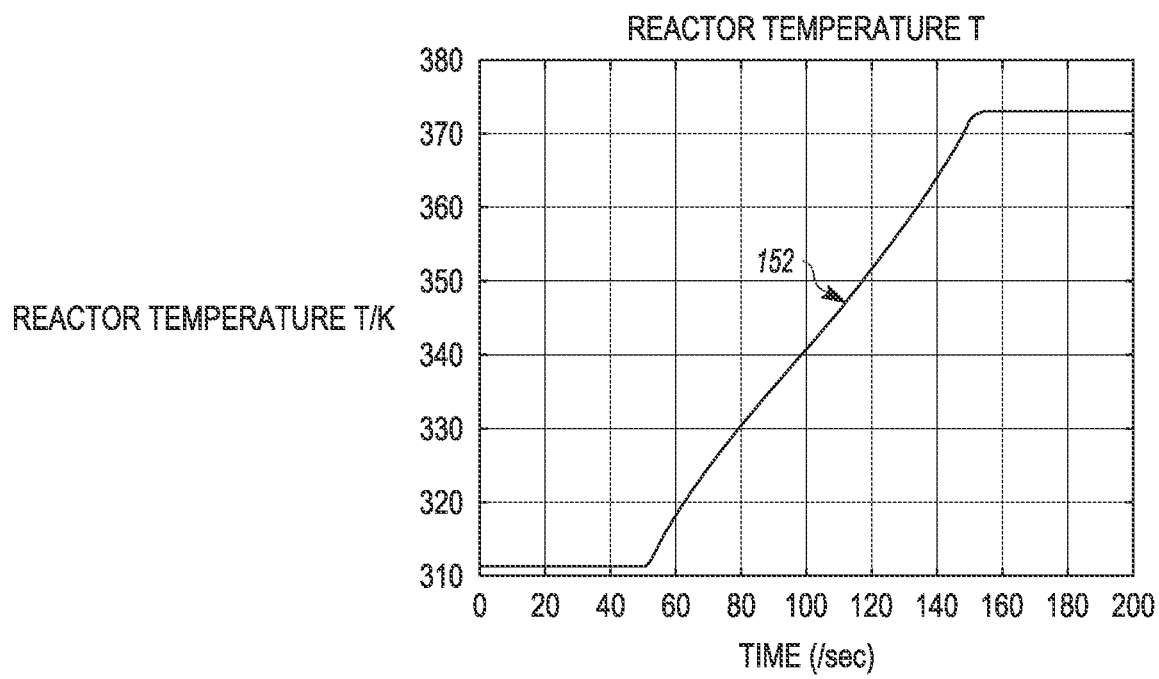
FIG. 11A is one example plot of reactor temperature over time, for one example industrial process controlled by an MPC device configured to implement model process parameters using linear parameter-varying (LPV) interpolation, based on a current operating state parameter of an industrial process.

FIG. 11A illustrates one example plot 152 of reactor temperature over time, for one example industrial process controlled by an MPC device configured to implement model process parameters using linear parameter-varying interpolation, based on a current operating state parameter of an industrial process. For example, the plot 152 may correspond to the MPC device 130 configured to operate with LPV interpolated parameters corresponding to different neighboring grid points 142 in the LPV grid 140 of FIG. 10.

As shown in FIG. 11A, the reactor temperature has a much smoother and stable closed-loop response as the reactor temperature transitions from its rising value to its final steady-state value, compared to the plot 62 in FIG. 4A based on the single steady-state model.

Figure 11B:
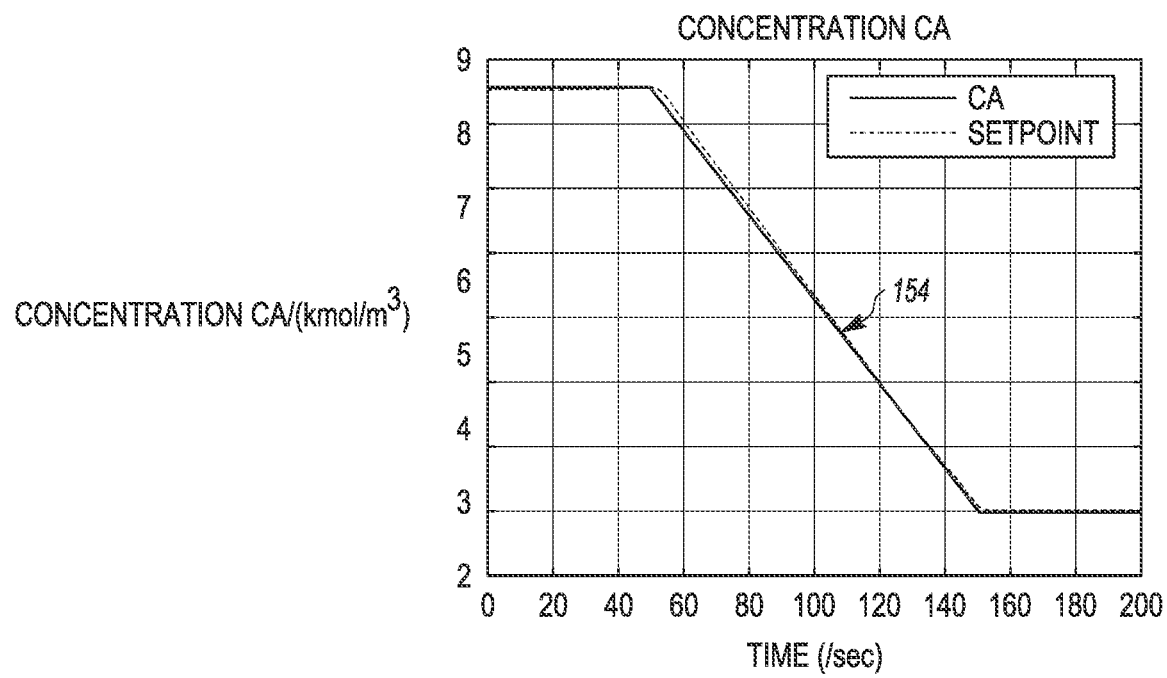
FIG. 11B is one example plot of concentration over time, for the example industrial process controlled by an MPC device configured to implement model process parameters using LPV interpolation, based on a current operating state parameter of an industrial process.

FIG. 11B illustrates one example plot 154 of concentration over time, for the example industrial process controlled by an MPC device configured to implement model process parameters using linear parameter-varying interpolation, based on a current operating state parameter of an industrial process. As shown in FIG. 11B, the concentration has a much smoother and stable closed-loop response as the reactor temperature transitions from its declining value to its final steady-state value, as compared to the plot 64 in FIG. 4B that is based on the single steady-state model.

Figure 11C:
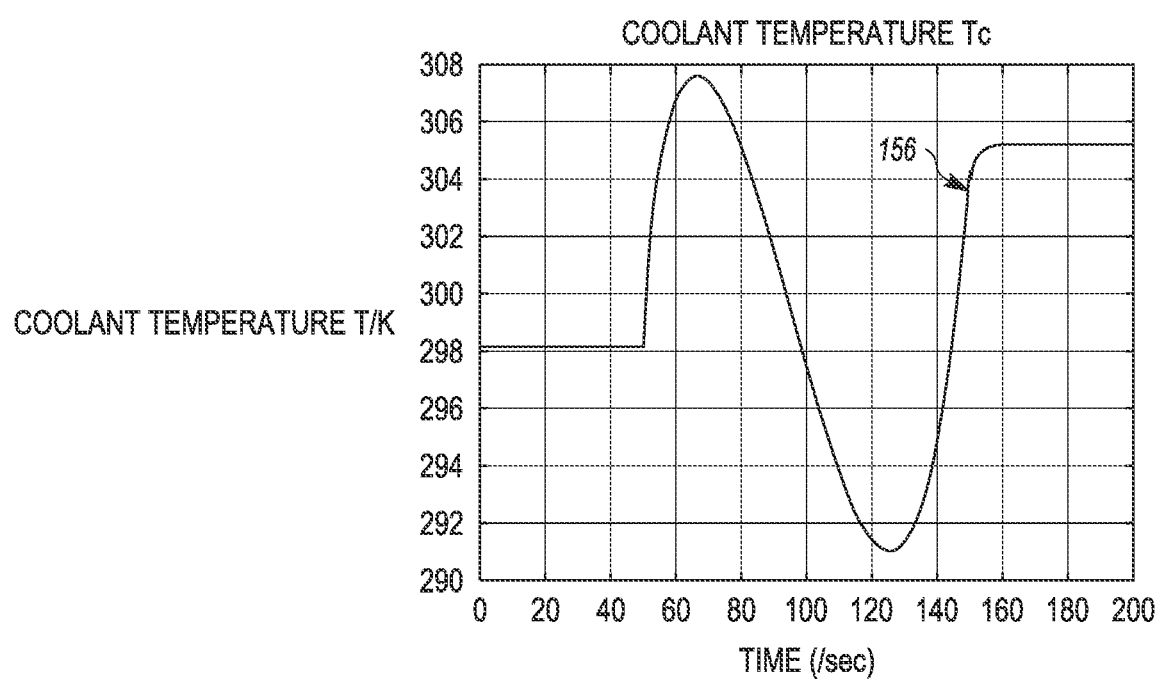
FIG. 11C is one example plot of coolant temperature over time, for the example industrial process controlled by an MPC device configured to implement model process parameters using LPV interpolation, based on a current operating state parameter of an industrial process.

FIG. 11C illustrates one example plot 156 of coolant temperature over time, for the example industrial process controlled by an MPC device configured to implement model process parameters using linear parameter-varying interpolation, based on a current operating state parameter of an industrial process. As shown in FIG. 11C, the coolant temperature has a much smoother and stable closed-loop response, as compared to the plot 66 in FIG. 4C that is based on the single steady-state model.

As shown in FIGS. 11A-C, the LPV process control system provides smooth and stable control during state transitions of the industrial process. As a result, employing model interpolation via LPV may significantly improve control performance in a nonlinear dynamic system. In some example embodiments, an MPC device using LPV control may provide better performance than gain scheduling with model switches. In an LPV system, the granularity of control is increased due to local sub-models associated with nodes in the scheduling space being specified ahead of time, and obtaining scheduling locations in between the grid points based on interpolation of neighboring points. Nodes containing sub-models in the LPV system may be distributed across a whole control system (such as the whole process control system 10), and a master node may coordinate controllers and interpolate the control actions.

In some example embodiments, a first MPC process model and a second MPC process model may define at least a portion of an interpolated array of linear state-space models. A processor of the MPC device 130 may be configured to predict the future industrial process output by interpolating a point between at least one control parameter of the first MPC process model and at least one control parameter of the second MPC process model, according to the current state parameter.

Interpolating may include interpolating a point between the at least one control parameter of the first MPC process model and the at least one control parameter of the second MPC process model according to a distance of the current state parameter from the first state value associated with the first MPC process model and the second state value associated with the second MPC process model.

Figure 12:
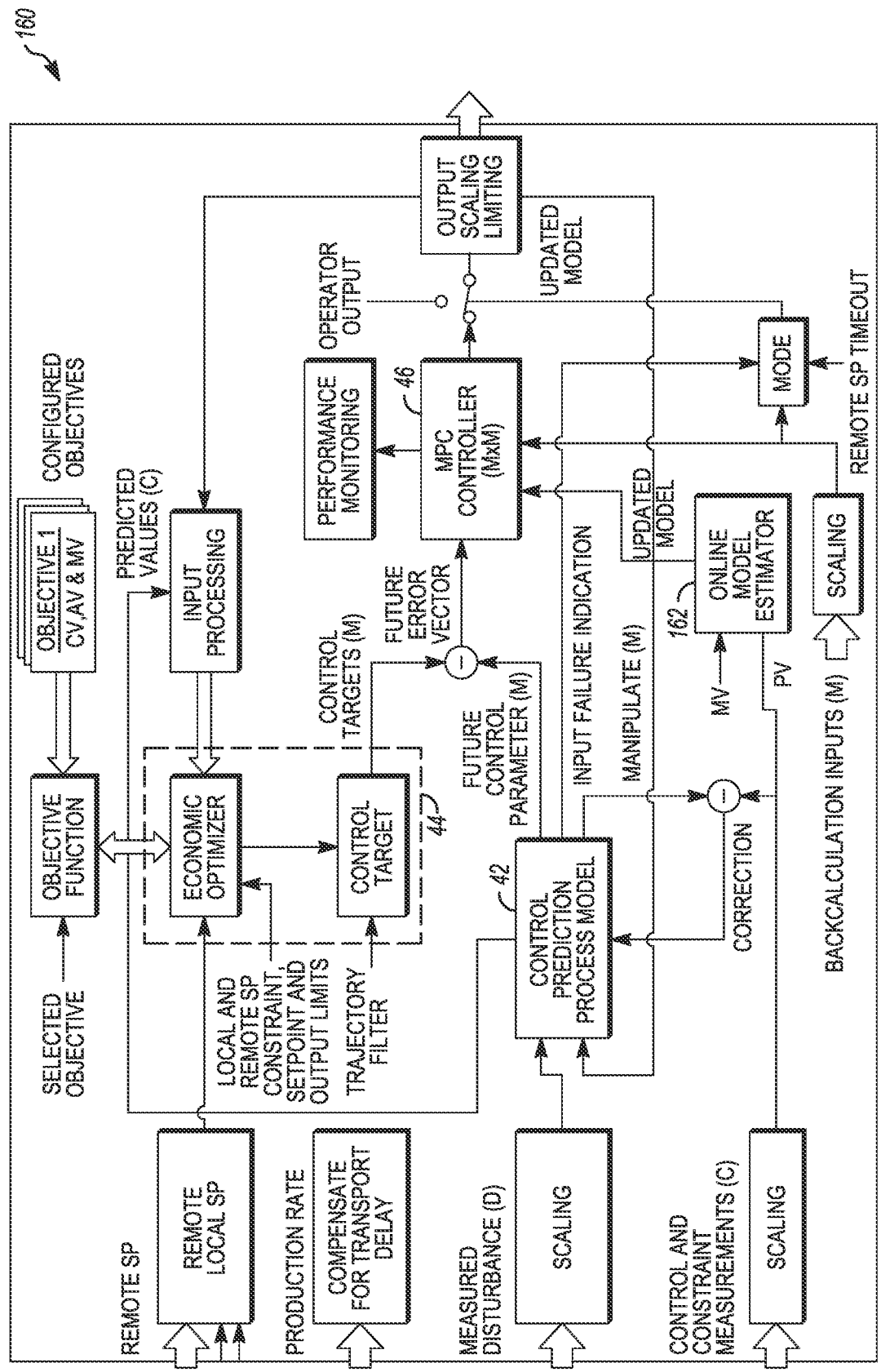
FIG. 12 is a block diagram of one example MPC device including an online model estimator module.

FIG. 12 illustrates one example MPC device 160 including an online model estimator module 162. The online model estimator module 162 may be configured to allow the MPC device 160 to operate using an updated model provided by the online model estimator module 162 in real time. For example, the MPC device 160 may be configured to change operation of at least one of the prediction block 42, the linear optimizer block 44 and the dynamic move calculation block 46, based on continually updated models from the online model estimator module 162 (which may be configured to generate an updated model every specified period, such as every minute, every hour, etc.).

In some example embodiments, a Kalman filter may be used with the online model estimator module 162. The online model estimator module 162 may improve control performance of the MPC device 160 when dealing with nonlinear processes. The online model estimator module 162 may avoid a need to define operating states of the industrial process and conduct gain scheduling, and may provide better performance than gain scheduling with model switches for some industrial processes. The online model estimator module 162 may allow the MPC device 160 to take advantage of, e.g., a built-in model estimation tool such as a model estimation tool of a DeltaV™ process controller of Emerson.

Figure 13A:
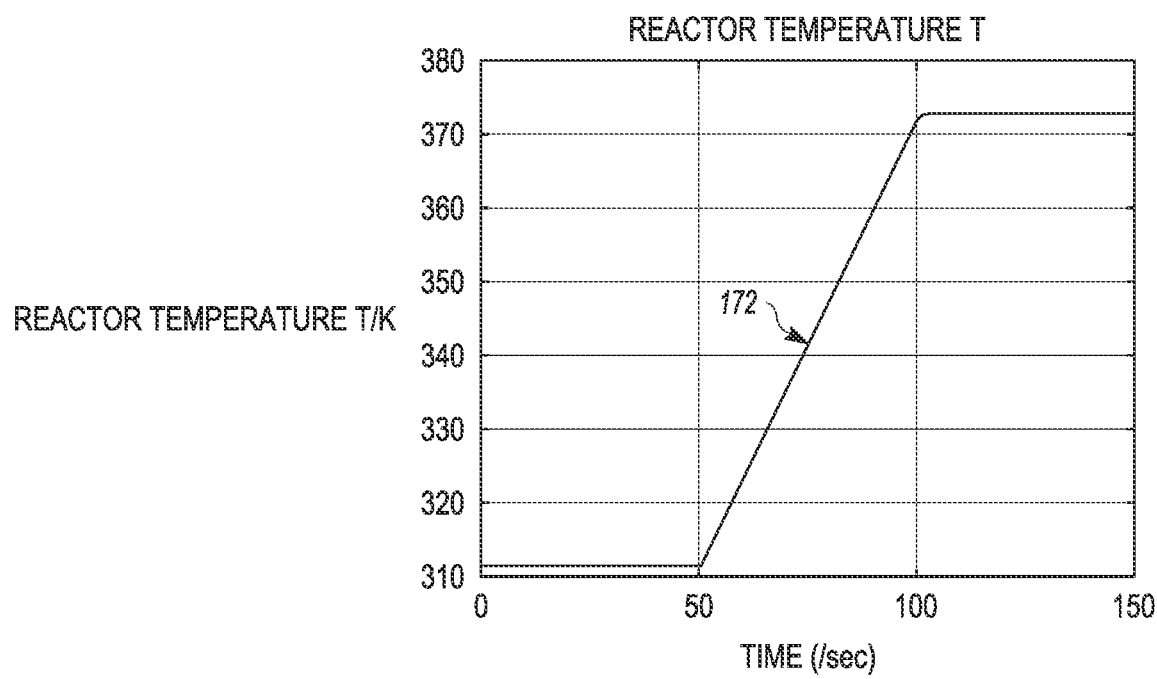
FIG. 13A is one example plot of reactor temperature over time, for one example industrial process controlled by an MPC device configured to implement an online model estimator module.

FIG. 13A illustrates one example plot 172 of reactor temperature over time, for one example industrial process controlled by an MPC device configured to implement an online model estimator module. As shown in FIG. 13A, the reactor temperature has a much smoother and stable closed-loop response as the reactor temperature transitions from its rising value to its final steady-state value, as compared to the plot 62 in FIG. 4A that is based on the single steady-state model.

Figure 13B:
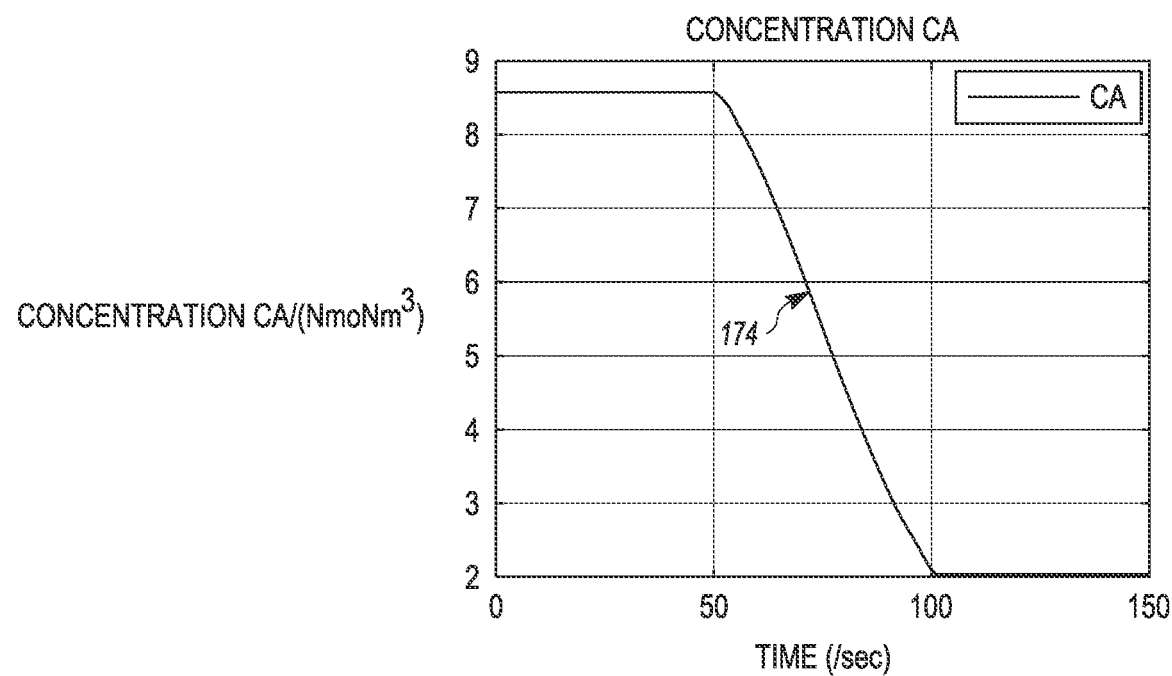
FIG. 13B is one example plot of concentration over time, for the example industrial process controlled by an MPC device configured to implement the online model estimator module.

FIG. 13B illustrates one example plot 154 of concentration over time, for the example industrial process controlled by an MPC device configured to implement the online model estimator module. As shown in FIG. 13B, the concentration has a much smoother and stable closed-loop response as the reactor temperature transitions from its declining value to its final steady-state value, as compared to the plot 64 in FIG. 4B that is based on the single steady-state model.

Figure 13C:
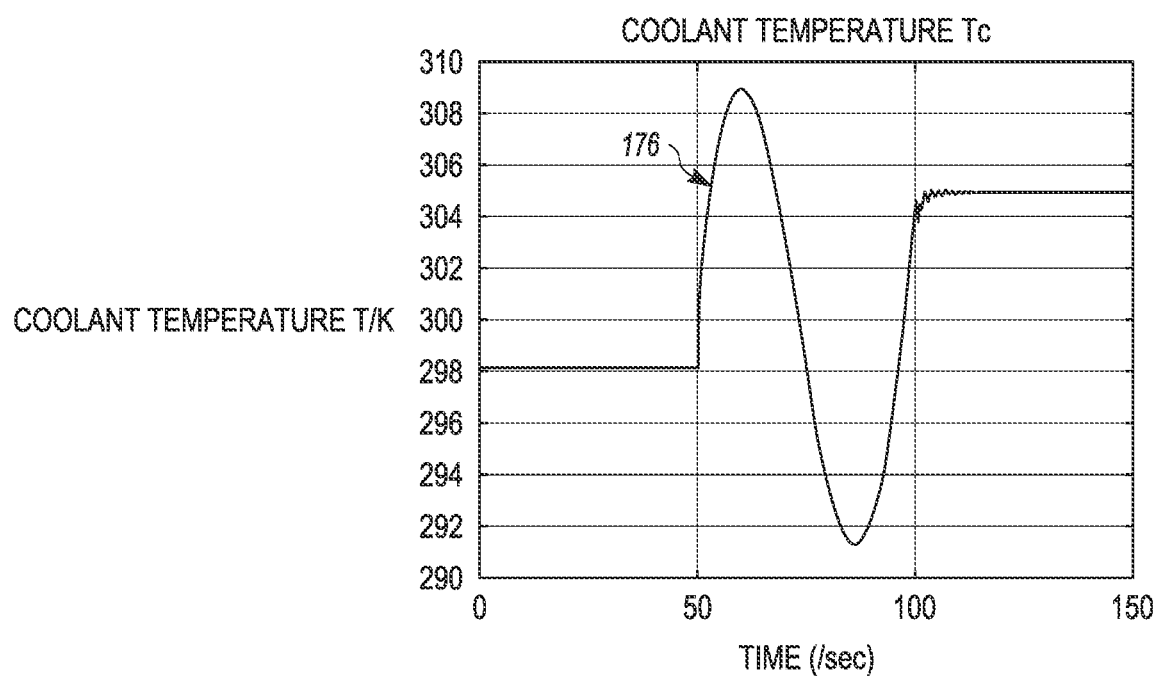
FIG. 13C is one example plot of coolant temperature over time, for the example industrial process controlled by an MPC device configured to implement the online model estimator module.

FIG. 13C illustrates one example plot 156 of coolant temperature over time, for the example industrial process controlled by an MPC device configured to implement the online model estimator module. As shown in FIG. 11C, the coolant temperature has a much smoother and stable closed-loop response, as compared to the plot 66 in FIG. 4C that is based on the single steady-state model.

As shown in FIGS. 13A-C, use of the online model estimator module 162 provides smooth and stable closed-loop control during state transitions of the industrial process. As a result, employing online model state estimation may significantly improve the control performance in a nonlinear dynamic system.

Because the MPC model is frequently updated by the online model estimator module 162 and may reflect an actual current process response of the industrial process, there may not be a need to define operating states and conduct gain scheduling. However, computational burden on the MPC device 160 may be increased due to updating control moves constantly based on the most recent model from the online model estimator module 162. In order to mitigate the computational burden, in some example embodiments cloud computing may be used where the model estimation and control move calculation is performed in the cloud.

The MPC device 160 may take advantage of a built-in online estimation tool, such as an online estimation tool of a DeltaV™ MPC controller by Emerson. Any suitable model architecture may be used, such as a finite step response (FSR) model, a first-order-plus-deadtime (FOPDT) model, etc. A model conversion step may be used if the online model estimator module 162 is configured to generate a different type of model than models used by other blocks of the MPC device 160.

In some example embodiments, the MPC device 160 may include an input interface configured to receive an industrial process input associated with at least one component of a process automation plant, an output interface configured to transmit a control instruction to control operation of the at least one component of the process automation plant, and memory configured to store an online model estimation module, and computer-executable instructions.

The MPC device 160 may include at least one processor configured to execute the computer-executable instructions to identify at least one current manipulated variable and at least one current process variable of the process automation plant, and generate, using the online model estimation module, an MPC process model according to the manipulated variable and the process variable of an industrial process of the process automation plant.

The MPC device 160 may be configured via the instructions to receive an industrial process input via the input interface, predict, using the generated MPC process model, a future industrial process output according to the received industrial process input, calculate a target operating point according to the predicted future industrial process output, determine a control signal to drive the industrial process to the calculated target operating point, and output the determined control signal via the output interface to control operation of the at least one component of the process automation plant. The MPC device 160 may be configured via the instructions to, subsequent to outputting the determined control signal, identify an updated manipulated variable and an updated process variable of the process automation plant, and generate, using the online model estimation module, an updated MPC process model according to at least the updated manipulated variable and the updated process variable of the process automation plant.

The at least one current process variable may include one or more of chemical concentration value, a temperature value, a pressure value, and a throughput value. The MPC process model may include at least one of a linear model, a finite step response (FSR) model, a first-order-plus-deadtime (FOPDT) model, and an autoregressive polynomial model.

Figure 14:
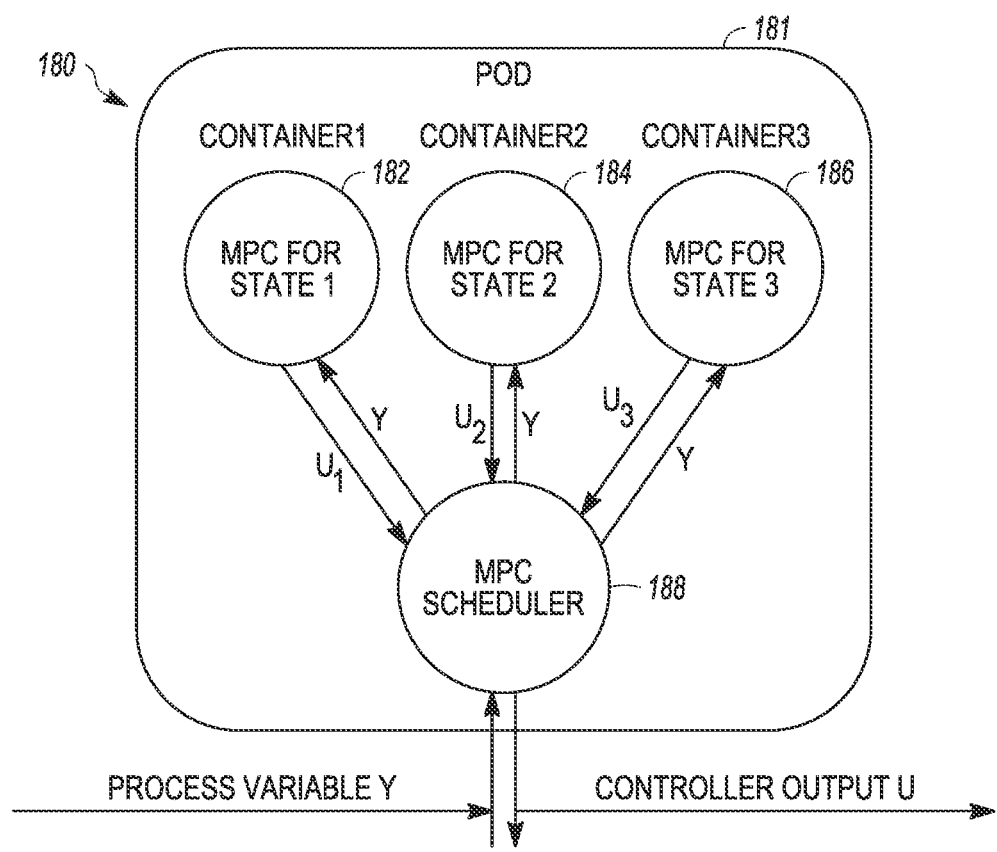
FIG. 14 is a block diagram of an MPC device including a containerized architecture.

FIG. 14 is a block diagram of one example MPC device 180 including multiple MPC controllers deployed in containers of a pod 181, along with a control scheduler 188. Each MPC controller may be built based on a different associated state of an industrial process plant. For example, a first MPC controller 182 may be implemented in a first container of the pod 181 and associated with a first state of an industrial process plant, a second MPC controller 184 may be implemented in a second container of the pod 181 and associated with a second state of an industrial process plant, and a third MPC controller 186 may be located in a third container of the pod 181 and associated with a third state of an industrial process plant.

In some example embodiments, the pod 181 and containers may be deployed in a Kubernetes open-source system for automating deployment, scaling, and management of containerized applications. Such an architecture (e.g., a Kubernetes cluster) may include a master node and several worker nodes. The Kubernetes environment may be configured to run workloads by placing containers into pods (such as the pod 181) to run on nodes. A node may be a virtual or physical machine, and each node is managed by the control plane and contains the services necessary to run pods.

Inside each pod 181, multiple MPCs with gain scheduling are deployed, as shown in FIG. 14. For example, a single MPC controller for one state may be deployed in a container as a service, and the MPC controller receives process variable Y from the MPC scheduler 188, which is also a containerized service. The MPC controller may perform computation and send back a controller output U_1. The MPC scheduler 188 may calculate an overall controller output U by switching between different MPC controllers, by combining the controller outputs, etc.

In some example embodiments, the MPC device 180 including a container architecture may improve control performance when dealing with nonlinear processes. The MPC device 180 may take advantage of various features of Kubernetes, such as automated rollouts and rollbacks (e.g., progressively rolling out changes to the control application or its configuration, while monitoring application health to ensure it does not kill all instances at the same time).

The MPC device 180 may implement self-healing, by restarting containers that fail, replacing and rescheduling containers when nodes die, and killing containers that do not respond to a user-defined health check. The MPC device may not advertise containers to clients until they are ready to serve.

In some example embodiments, the MPC device 180 may implement horizontal scaling, which may include scaling an application up and down with a simple command, with a user interface, automatically based on CPU usage, etc. The MPC device 160 may deploy multiple MPC controllers with gain scheduling in Kubernetes to improve nonlinear control performance. The MPC device 160 may be deployed in the cloud, such as AWS Elastic Kubernetes Engine (EKS), or Azure Kubernetes Service (AKS).

In some example embodiments, memory of an MPC device 160 may include multiple containers arranged in a pod architecture, a first MPC process model may be implemented in a first one of the multiple containers, and a second MPC process model may be implemented in a second one of the multiple containers. A processor may be configured to access the first MPC process model in the first one of the multiple containers in response to the current state parameter having the first state value associated with the second MPC process model, and access the second MPC process model in the second one of the multiple containers in response to the current state parameter having the second state value associated with the second MPC process model.

The pod architecture may be a Kubernetes architecture, where the first MPC process model is deployed in the first one of the multiple containers as a service, the second MPC process model is deployed in the second one of the multiple containers as a service, and the processor may be configured via instructions to execute an MPC scheduler service to switch between the first MPC process model and the second MPC process model, based on the current state parameter. In some example embodiments, the processor may be configured via instructions to execute an MPC scheduler service to combine outputs of the first MPC process model and the second MPC process model by interpolation, based on the current state parameter.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A model predictive control (MPC) device, comprising:
an input interface configured to receive an industrial process input associated with at least one component of a process automation plant;
an output interface configured to transmit a control instruction to control operation of the at least one component of the process automation plant;
memory configured to store a first MPC process model, a second MPC process model, and computer-executable instructions, the first MPC process model including at least one control parameter different than a control parameter of the second MPC process model, the at least one control parameter including one or more of a gain value, a time constant value, and a dead time value; and
at least one processor configured to execute the computer-executable instructions to:
receive an industrial process input via the input interface;
identify a current state parameter of an industrial process of the process automation plant;
predict, using the first MPC process model, a future industrial process output according to the received industrial process input, in response to the current state parameter having a first state value associated with the first MPC process model;
predict, using the second MPC process model, the future industrial process output according to the received industrial process input, in response to the current state parameter having a second state value associated with the second MPC process model, the first state value different than the second state value;
calculate a target operating point according to the predicted future industrial process output;
determine a control signal to drive the industrial process to the calculated target operating point; and
output the determined control signal via the output interface to control operation of the at least one component of the process automation plant.

2. The MPC device of claim 1, wherein each of the first MPC process model and the second MPC process model includes a linear steady-state model obtained via step tests.

3. The MPC device of claim 1, wherein the at least one processor is configured to switch operation between the first MPC process model and the second MPC process model according to automated detection of a change in the current state parameter, from the first state value associated with the first MPC process model to the second state value associated with the second MPC process model.

4. The MPC device of claim 1, wherein the at least one processor is configured to switch operation between the first MPC process model and the second MPC process model in response to a manual input received at the MPC device.

5. The MPC device of claim 1, wherein the current state parameter includes at least one of a chemical concentration value, a temperature value, a pressure value, and a throughput value.

6. The MPC device of claim 1, wherein the at least one processor is configured to:
receive a third MPC process model having at least one control parameter different than a control parameter of the first MPC process model and a control parameter of the second MPC process model, the third MPC process model associated with a third state value of the process automation plant, the third state value different than the first state value and the second state value;
store the third MPC process model in the memory; and
predict, using the third MPC process model, the future industrial process output according to the received industrial process input, in response to the current state parameter having the third state value.

7. The MPC device of claim 1, wherein the at least one component of the process automation plant includes a continuous stirred-tank reactor.

8. The MPC device of claim 1, wherein the first MPC process model and the second MPC process model define at least a portion of an interpolated array of linear state-space models, and the at least one processor is configured to:
predict the future industrial process output by interpolating a point between at least one control parameter of the first MPC process model and at least one control parameter of the second MPC process model, according to the current state parameter.

9. The MPC device of claim 8, wherein the interpolating includes interpolating the point between the at least one control parameter of the first MPC process model and the at least one control parameter of the second MPC process model according to a distance of the current state parameter from the first state value associated with the first MPC process model and the second state value associated with the second MPC process model.

10. The MPC device of claim 1, wherein the memory includes multiple containers arranged in a pod architecture, the first MPC process model is implemented in a first one of the multiple containers, the second MPC process model is implemented in a second one of the multiple containers, and the at least one processor is configured to:
   access the first MPC process model in the first one of the multiple containers in response to the current state parameter having the first state value associated with the second MPC process model; and
   access the second MPC process model in the second one of the multiple containers in response to the current state parameter having the second state value associated with the second MPC process model.

11. The MPC device of claim 10, wherein:
   the pod architecture is a Kubernetes architecture;
   the first MPC process model is deployed in the first one of the multiple containers as a service;
   the second MPC process model is deployed in the second one of the multiple containers as a service; and
   the at least one processor is configured to execute an MPC scheduler service to switch between the first MPC process model and the second MPC process model, based on the current state parameter.

12. The MPC device of claim 10, wherein:
   the pod architecture is a Kubernetes architecture;
   the first MPC process model is deployed in the first one of the multiple containers as a service;
   the second MPC process model is deployed in the second one of the multiple containers as a service; and
   the at least one processor is configured to execute an MPC scheduler service to combine outputs of the first MPC process model and the second MPC process model by interpolation, based on the current state parameter.

13. A method of determining state parameter clusters for a model predictive control (MPC) device of a process automation plant, the method comprising:
   receiving a specified number of operating point clusters;
   obtaining, via an input interface, at least one operating state parameter associated with at least one component of the process automation plant, the at least one operating state parameter obtained at multiple time points during operation of the process automation plant to define multiple historical operating state parameter values;
   applying a clustering algorithm to the multiple historical operating state parameter values to define a specified number of operating regions, the specified number of operating regions equal to the specified number of operating point clusters;
   generating, for each of the specified number of operating regions, an MPC process model according to parameters associated with the operating region;
   sensing a current state parameter of the at least one component of the process automation plant; and
   controlling operation of the at least one component of the process automation plant according to the MPC process model associated with the current state parameter.

14. The method of claim 13, further comprising:
   subsequent to generating each MPC process model, obtaining the at least one operating state parameter obtained at multiple additional time points during operation of the process automation plant to define multiple updated operating state parameter values;
   applying the clustering algorithm to the multiple updated operating state parameter values to define a specified number of updated operating regions; and
   generating, for each of the specified number of updated operating regions, an updated MPC process model according to parameters associated with the updated operating region.

15. The method of claim 13, wherein the clustering algorithm includes at least one of a k-means clustering algorithm, a density based spatial clustering of applications with noise (DBSCAN) algorithm, a mean-shift clustering algorithm, an expectation-maximization (EM) clustering algorithm using a gaussian mixture model (GMM), or an agglomerative hierarchical clustering algorithm.

16. The method of claim 13, wherein generating an MPC process model includes estimating a process gain value, a time constant value and a dead time value for the MPC process model according to at least a portion of the multiple historical operating state parameter values associated with the operating region of the MPC process model.

17. The method of claim 13, wherein the current state parameter includes at least one of a chemical concentration value, a temperature value, a pressure value, and a throughput value.

18. A model predictive control (MPC) device, comprising:
   an input interface configured to receive an industrial process input associated with at least one component of a process automation plant;
   an output interface configured to transmit a control instruction to control operation of the at least one component of the process automation plant;
   memory configured to store an online model estimation module, and computer-executable instructions; and
   at least one processor configured to execute the computer-executable instructions to:
      identify at least one current manipulated variable and at least one current process variable of the process automation plant;
      generate, using the online model estimation module, an MPC process model according to the at least one current manipulated variable and the at least one current process variable of an industrial process of the process automation plant;
      receive an industrial process input via the input interface;
      predict, using the generated MPC process model, a future industrial process output according to the received industrial process input;
      calculate a target operating point according to the predicted future industrial process output;
      determine a control signal to drive the industrial process to the calculated target operating point;
      output the determined control signal via the output interface to control operation of the at least one component of the process automation plant;
      subsequent to outputting the determined control signal, identify an updated manipulated variable and an updated process variable of the process automation plant; and
      generate, using the online model estimation module, an updated MPC process model according to at least the updated manipulated variable and the updated process variable of the process automation plant.

19. The MPC device of claim 18, wherein the at least one current process variable includes one or more of chemical concentration value, a temperature value, a pressure value, and a throughput value.

20. The MPC device of claim 19, wherein the generated MPC process model includes at least one of a linear model, a finite step response (FSR) model, a first-order-plus-dead-time (FOPDT) model, and an autoregressive polynomial model.

* * * * *